United States Patent
Corrigan et al.

(10) Patent No.: US 11,154,077 B2
(45) Date of Patent: Oct. 26, 2021

(54) PROCESS FOR DUSTING ANIMAL FOOD

(71) Applicant: MARS, INCORPORATED, McLean, VA (US)

(72) Inventors: Patrick Joseph Corrigan, Glendale, OH (US); Michelle Marie Houston, West Chester, OH (US); Gregory Dean Sunvold, Lewisburg, OH (US)

(73) Assignee: MARS, INCORPORATED, McLean, VA (US)

( * ) Notice: Subject to any disclaimer, the term of this patent is extended or adjusted under 35 U.S.C. 154(b) by 0 days.

(21) Appl. No.: 14/798,441

(22) Filed: Jul. 13, 2015

(65) Prior Publication Data

US 2015/0313258 A1 Nov. 5, 2015

Related U.S. Application Data

(63) Continuation of application No. 12/533,032, filed on Jul. 31, 2009, now abandoned.

(51) Int. Cl.
| | |
|---|---|
| A23K 40/10 | (2016.01) |
| A23K 50/42 | (2016.01) |
| A23K 20/00 | (2016.01) |
| A23K 10/18 | (2016.01) |
| A23K 20/174 | (2016.01) |
| A23K 40/20 | (2016.01) |
| A23K 40/30 | (2016.01) |

(52) U.S. Cl.
CPC .............. *A23K 40/10* (2016.05); *A23K 10/18* (2016.05); *A23K 20/00* (2016.05); *A23K 20/174* (2016.05); *A23K 40/20* (2016.05); *A23K 40/30* (2016.05); *A23K 50/42* (2016.05); *A23V 2002/00* (2013.01)

(58) Field of Classification Search
CPC ...... A23K 40/20; A23K 50/42; A23K 20/174; A23K 40/10; A23K 1/004; A23K 40/30; A23K 10/18; A23K 20/00; A23V 2002/00; A23V 2200/3204; A23V 2200/22
USPC ............................................ 426/6, 289, 295
See application file for complete search history.

(56) References Cited

U.S. PATENT DOCUMENTS

| | | |
|---|---|---|
| 2,504,233 A | 4/1950 | Staunt |
| 2,827,452 A | 3/1958 | Schlenk et al. |
| 3,119,691 A | 1/1964 | Ludington et al. |
| 3,168,796 A | 2/1965 | Scott et al. |
| 3,467,525 A | 9/1969 | Hale et al. |
| 3,808,340 A | 4/1974 | Palmer |
| 3,808,341 A | 4/1974 | Rongey et al. |
| 3,890,320 A | 6/1975 | Wolt |
| 3,930,031 A | 12/1975 | Kealy |
| 3,997,675 A * | 12/1976 | Eichelburg ............. A23K 50/45 426/289 |
| 4,015,026 A | 3/1977 | Burkwall et al. |
| 4,070,490 A | 1/1978 | Lugay et al. |
| 4,088,796 A | 5/1978 | Persson |
| 4,092,333 A | 5/1978 | Mookherjee et al. |
| 4,104,406 A | 8/1978 | Stringer et al. |
| 4,104,407 A | 8/1978 | Stringer et al. |
| 4,211,797 A | 7/1980 | Cante et al. |
| 4,225,630 A | 9/1980 | Pitchon |
| 4,229,485 A | 10/1980 | Brown et al. |
| 4,273,788 A | 6/1981 | Bone et al. |
| 4,366,175 A | 12/1982 | Brown et al. |
| 4,411,924 A | 10/1983 | Sevenants |
| 4,508,741 A | 4/1985 | Corbett et al. |
| 4,702,924 A | 10/1987 | Owens et al. |
| 4,702,994 A | 10/1987 | Owens |
| 4,713,250 A | 12/1987 | Tonyes et al. |
| 4,777,058 A | 10/1988 | Chandler et al. |
| 4,804,549 A | 2/1989 | Howley et al. |
| 4,822,626 A | 4/1989 | Spanier et al. |
| 4,870,059 A | 9/1989 | Mitsuhashi et al. |
| 4,888,171 A | 12/1989 | Okonogi et al. |
| 4,900,572 A | 2/1990 | Repholz et al. |
| 4,904,494 A | 2/1990 | Spanier |
| 4,927,763 A | 5/1990 | Sudoma et al. |
| 4,956,295 A | 9/1990 | Sudoma |
| 5,085,874 A | 2/1992 | Jungvid |
| 5,147,668 A | 9/1992 | Munk |
| 5,186,964 A | 2/1993 | Gierhart et al. |
| 5,204,102 A | 4/1993 | Coles et al. |

(Continued)

FOREIGN PATENT DOCUMENTS

| | | |
|---|---|---|
| CA | 1131063 | 9/1982 |
| DE | 102004008085 | 9/2005 |

(Continued)

OTHER PUBLICATIONS

© Springer International Publishing Switzerland 2016 G. Saravacos, A.E. Kostaropoulos, Handbook of Food Processing Equipment, p. 151. Food Engineering Series, DOI 10.1007/978-3-319-25020-5_4.*
Ubbink (Trends in Food Science & Technology 17 (2006) 244-254 (Year: 2006).*
Biourge et al.: "The Use of Probiotics in the Diet of Dogs"— American Society for Nutritional Sciences, Journal of Nutrition 128: 2730S-2732S, 1998.
Website: "Kibble 'n Bits"—http://www.kibblesnbits.com/varieties/brushingbites.aspx.
PCT International Search Report dated Nov. 10, 2010.

(Continued)

*Primary Examiner* — Subbalakshmi Prakash
(74) *Attorney, Agent, or Firm* — Baker Botts L.L.P.

(57) ABSTRACT

A dusted pet food kibble and a process for dusting a pet food kibble comprising providing a pet food kibble in the form of a core matrix, providing a powder comprising a first component that can comprise an active ingredient, such as Probiotic microorganism particles, and dusting the powder onto the pet food kibble to form a dusted kibble. The dusting can occur substantially free of a binder. An animal feed comprising a kibble in the form of a core dusted with active ingredients.

17 Claims, No Drawings

(56) References Cited

U.S. PATENT DOCUMENTS

| | | | |
|---|---|---|---|
| 5,281,431 | A | 1/1994 | Dunckel |
| 5,283,059 | A | 2/1994 | Suzuki et al. |
| 5,478,570 | A | 12/1995 | Sunohara et al. |
| 5,480,641 | A | 1/1996 | Casas Perez |
| 5,487,910 | A | 1/1996 | Zabel et al. |
| 5,505,969 | A | 4/1996 | Wood et al. |
| 5,508,243 | A | 4/1996 | Mitzkat |
| 5,532,010 | A | 7/1996 | Spanier et al. |
| 5,543,157 | A | 8/1996 | Trinh et al. |
| 5,592,748 | A | 1/1997 | Mitzkat et al. |
| 5,603,974 | A | 2/1997 | Wood et al. |
| 5,603,976 | A | 2/1997 | Share et al. |
| 5,650,184 | A | 7/1997 | Humphry et al. |
| 5,786,008 | A | 7/1998 | Humphry et al. |
| 5,871,802 | A | 2/1999 | Gao |
| 5,883,161 | A | 3/1999 | Wood et al. |
| 5,894,029 | A * | 4/1999 | Brown ............... A23K 50/42 426/302 |
| 5,968,569 | A * | 10/1999 | Cavadini ............ A61K 35/742 426/61 |
| 6,010,725 | A | 1/2000 | Cavadini et al. |
| 6,042,857 | A | 3/2000 | Jones et al. |
| 6,063,414 | A | 5/2000 | Jones et al. |
| 6,083,520 | A | 7/2000 | Toneby |
| 6,113,970 | A | 9/2000 | Rainey et al. |
| 6,117,477 | A | 9/2000 | Paluch |
| 6,132,786 | A | 10/2000 | Poulos et al. |
| 6,150,004 | A | 11/2000 | Oikawa et al. |
| 6,159,508 | A | 12/2000 | Wolf |
| 6,200,609 | B1 | 3/2001 | Meister et al. |
| 6,218,013 | B1 | 4/2001 | Wood et al. |
| 6,228,418 | B1 | 5/2001 | Gluck et al. |
| 6,254,910 | B1 | 7/2001 | Paluch |
| 6,270,820 | B1 * | 8/2001 | Fritz-Jung ......... A23K 50/42 426/302 |
| 6,274,190 | B1 | 8/2001 | Long et al. |
| 6,309,676 | B1 | 10/2001 | Lewandowski |
| 6,312,746 | B2 | 11/2001 | Paluch |
| 6,350,485 | B2 | 2/2002 | Brunner |
| 6,482,794 | B1 | 11/2002 | Farbood et al. |
| 6,592,924 | B2 | 7/2003 | Blank et al. |
| 6,660,319 | B1 | 12/2003 | Shi et al. |
| 6,699,701 | B1 | 3/2004 | Sulakvelidze et al. |
| 6,703,040 | B2 | 3/2004 | Katsarava et al. |
| 6,827,957 | B2 | 12/2004 | Paluch et al. |
| 6,841,179 | B2 | 1/2005 | Lin et al. |
| 6,926,917 | B2 | 8/2005 | Parthasarathy |
| 6,991,819 | B2 | 1/2006 | Pannevis et al. |
| 7,037,708 | B1 | 5/2006 | Runge et al. |
| 7,067,150 | B2 | 6/2006 | Farber et al. |
| 7,163,708 | B2 | 1/2007 | Dalziel et al. |
| 7,186,437 | B2 | 3/2007 | Guiller et al. |
| 7,189,390 | B2 | 3/2007 | Zink et al. |
| 7,211,280 | B1 | 5/2007 | Young et al. |
| 7,211,426 | B2 | 5/2007 | Bruessow et al. |
| 7,229,818 | B2 | 6/2007 | Porubcan |
| 7,244,460 | B2 | 7/2007 | Lee et al. |
| 7,288,275 | B2 | 10/2007 | Axelrod et al. |
| 7,303,778 | B2 | 12/2007 | McMindes et al. |
| 7,318,920 | B2 | 1/2008 | Christensen |
| 7,365,584 | B2 | 4/2008 | Bennett et al. |
| 7,381,406 | B2 | 6/2008 | Zink et al. |
| 7,459,272 | B2 | 12/2008 | Morris et al. |
| 7,479,294 | B2 | 1/2009 | Sokhey et al. |
| 7,479,386 | B2 | 1/2009 | Couzy et al. |
| 7,494,677 | B2 | 2/2009 | Merrill et al. |
| 7,507,571 | B2 | 3/2009 | Paternack et al. |
| 7,547,527 | B2 | 6/2009 | Baur et al. |
| 7,622,293 | B2 | 11/2009 | Sulakvelidze et al. |
| 7,625,556 | B2 | 12/2009 | Sulakvelidze et al. |
| 7,625,739 | B2 | 12/2009 | Pasternack et al. |
| 7,625,740 | B2 | 12/2009 | Pasternack et al. |
| 7,625,741 | B2 | 12/2009 | Pasternack et al. |
| 7,635,584 | B2 | 12/2009 | Sulakvelidze et al. |
| 7,645,471 | B2 | 1/2010 | Harris |
| 7,674,467 | B2 | 3/2010 | Sulakvelidze et al. |
| 7,703,411 | B1 | 4/2010 | Bakos et al. |
| 7,745,194 | B2 | 6/2010 | Pasternack et al. |
| 7,757,836 | B2 | 7/2010 | Karpinsky et al. |
| 7,785,635 | B1 | 8/2010 | Boileau et al. |
| 7,867,540 | B2 | 1/2011 | Didzbalis et al. |
| 7,951,493 | B2 | 5/2011 | Lin et al. |
| 7,951,575 | B2 | 5/2011 | Bruessow et al. |
| 7,977,319 | B1 | 7/2011 | Levine |
| 7,989,013 | B2 | 8/2011 | Chaintreau et al. |
| 8,003,323 | B2 | 8/2011 | Morris et al. |
| 8,021,657 | B2 | 9/2011 | Bruessow et al. |
| 8,181,592 | B2 | 5/2012 | Karpinsky et al. |
| 8,210,746 | B2 | 7/2012 | Kerr et al. |
| 8,288,391 | B2 | 10/2012 | Johnson et al. |
| 8,309,077 | B2 | 11/2012 | Murthy et al. |
| 8,359,995 | B2 | 1/2013 | Bakos et al. |
| 8,524,299 | B2 | 9/2013 | Brent, Jr. |
| 8,609,166 | B2 | 12/2013 | Laborbe et al. |
| 8,647,690 | B2 | 2/2014 | Corrigan |
| 8,685,696 | B2 | 4/2014 | Pasternack et al. |
| 8,685,697 | B1 | 4/2014 | Pasternack et al. |
| 8,691,303 | B2 | 4/2014 | Sunvold et al. |
| 8,802,158 | B2 | 8/2014 | Boileau et al. |
| 8,809,035 | B2 | 8/2014 | Boileau et al. |
| 8,887,659 | B2 | 11/2014 | Fiesser |
| 8,956,628 | B2 | 2/2015 | Mathers et al. |
| 9,072,310 | B2 | 7/2015 | Harel et al. |
| 9,131,703 | B2 | 9/2015 | Marchal et al. |
| 9,173,423 | B2 | 11/2015 | Horgan et al. |
| 9,585,412 | B2 | 3/2017 | Corrigan et al. |
| 2003/0044492 | A1 | 3/2003 | Knigge et al. |
| 2003/0077356 | A1 | 4/2003 | Campbell et al. |
| 2003/0175387 | A1 | 9/2003 | English |
| 2003/0190309 | A1 | 10/2003 | Zink et al. |
| 2003/0215547 | A1 | 11/2003 | Leyh |
| 2004/0033293 | A1 | 2/2004 | Albert |
| 2004/0047896 | A1 | 3/2004 | Malnoe et al. |
| 2004/0115246 | A1 | 6/2004 | Locatelli |
| 2004/0115308 | A1 | 6/2004 | Bengtsson Riveros et al. |
| 2004/0166206 | A1 | 8/2004 | Archibald et al. |
| 2004/0175389 | A1 | 9/2004 | Porubcan |
| 2004/0191224 | A1 | 9/2004 | Sulakvelidze et al. |
| 2004/0208853 | A1 | 10/2004 | Sulakvelidze et al. |
| 2005/0060707 | A1 | 3/2005 | Tunney |
| 2005/0064073 | A1 | 3/2005 | Paluch et al. |
| 2005/0153018 | A1 | 3/2005 | Urbink et al. |
| 2005/0079244 | A1 | 4/2005 | Giffard et al. |
| 2005/0092116 | A1 | 5/2005 | Pachov |
| 2005/0100559 | A1 | 5/2005 | Myatt et al. |
| 2005/0106132 | A1 | 5/2005 | Porubcan |
| 2005/0106133 | A1 | 5/2005 | Zink et al. |
| 2005/0147649 | A1 | 7/2005 | Perez et al. |
| 2005/0147651 | A1 | 7/2005 | Schert et al. |
| 2005/0152884 | A1 | 7/2005 | Boileau et al. |
| 2005/0158291 | A1 | 7/2005 | Breton |
| 2005/0158293 | A1 | 7/2005 | Boileau et al. |
| 2005/0158294 | A1 | 7/2005 | Boileau et al. |
| 2005/0170067 | A1 | 8/2005 | Shao |
| 2005/0175598 | A1 | 8/2005 | Boileau et al. |
| 2005/0186305 | A1 | 8/2005 | Rosenberg et al. |
| 2005/0214420 | A1 | 9/2005 | Schmidt et al. |
| 2005/0266069 | A1 | 12/2005 | Simmons et al. |
| 2005/0271709 | A1 | 12/2005 | Dazliel et al. |
| 2005/0281910 | A1 | 12/2005 | Schiffrin et al. |
| 2006/0099321 | A1 | 1/2006 | Carlson et al. |
| 2006/0062892 | A1 | 3/2006 | Merrick |
| 2006/0124675 | A1 | 6/2006 | Calicott |
| 2006/0134132 | A1 | 6/2006 | Vvatkins et al. |
| 2006/0147585 | A1 * | 7/2006 | Winckelmann ...... A23G 3/0085 426/96 |
| 2006/0228448 | A1 | 10/2006 | Boileau et al. |
| 2006/0260537 | A1 | 11/2006 | Brent, Jr. |
| 2006/0263416 | A1 | 11/2006 | Brent |
| 2006/0269534 | A1 | 11/2006 | Boileau et al. |
| 2006/0270020 | A1 | 11/2006 | Boileau et al. |
| 2007/0031542 | A1 | 2/2007 | Che et al. |
| 2007/0054357 | A1 | 3/2007 | Pasternack et al. |
| 2007/0059297 | A1 | 3/2007 | Waldron et al. |

(56) References Cited

U.S. PATENT DOCUMENTS

| | | |
|---|---|---|
| 2007/0098744 A1 | 5/2007 | Knorr et al. |
| 2007/0160589 A1 | 7/2007 | Mattson |
| 2007/0178079 A1 | 8/2007 | Zink et al. |
| 2007/0202087 A1 | 8/2007 | Baillon et al. |
| 2007/0218164 A1 | 9/2007 | Stojanovic |
| 2007/0251465 A1 | 11/2007 | Shafer et al. |
| 2007/0269553 A1 | 11/2007 | Le et al. |
| 2007/0269562 A1 | 11/2007 | Chukwu |
| 2007/0280964 A1 | 12/2007 | Knorr et al. |
| 2008/0026063 A1 | 1/2008 | Ueda et al. |
| 2008/0057169 A1 | 3/2008 | Archibald et al. |
| 2008/0085350 A1 | 4/2008 | Shi et al. |
| 2008/0095752 A1 | 4/2008 | Chiang et al. |
| 2008/0145341 A1 | 6/2008 | Myatt et al. |
| 2008/0171106 A1 | 7/2008 | Zink et al. |
| 2008/0206405 A1 | 8/2008 | Axelrod et al. |
| 2008/0213431 A1 | 9/2008 | Connolly et al. |
| 2008/0220126 A1 | 9/2008 | Boileau et al. |
| 2008/0247156 A1 | 10/2008 | Boileau et al. |
| 2008/0248156 A1 | 10/2008 | Boileau et al. |
| 2008/0254177 A1 | 10/2008 | Lin et al. |
| 2008/0260893 A1 | 10/2008 | Giffard et al. |
| 2008/0280274 A1 | 11/2008 | Friesen et al. |
| 2008/0299286 A1 | 12/2008 | Josephson et al. |
| 2008/0302678 A1 | 12/2008 | Hunwisk et al. |
| 2008/0305094 A1 | 12/2008 | Pridmore-Merten |
| 2008/0305210 A1 | 12/2008 | Petersen |
| 2008/0311226 A1 | 12/2008 | Yamka et al. |
| 2008/0317905 A1 | 12/2008 | Yamka et al. |
| 2009/0017130 A1 | 1/2009 | Yamka et al. |
| 2009/0017163 A1 | 1/2009 | Garbolino et al. |
| 2009/0087831 A1 | 4/2009 | Sulakvelidze et al. |
| 2009/0104315 A1 | 4/2009 | Friesen et al. |
| 2009/0110778 A1 | 4/2009 | Muscroft |
| 2009/0136163 A1 | 5/2009 | Kerr et al. |
| 2009/0246336 A1 | 10/2009 | Burnett et al. |
| 2010/0068337 A1 | 3/2010 | Reber et al. |
| 2010/0166709 A1 | 7/2010 | Kang et al. |
| 2010/0209572 A1 | 8/2010 | Guidetti |
| 2010/0233320 A1 | 9/2010 | Sunvold et al. |
| 2010/0233756 A1 | 9/2010 | Sunvold et al. |
| 2010/0303951 A1 | 12/2010 | Sunvold et al. |
| 2010/0303966 A1 | 12/2010 | Sunvold et al. |
| 2010/0303967 A1 | 12/2010 | Sunvold et al. |
| 2010/0303968 A1 | 12/2010 | Sunvold et al. |
| 2010/0303976 A1 | 12/2010 | Corrigan et al. |
| 2010/0303978 A1 | 12/2010 | Sunvold et al. |
| 2011/0027417 A1 | 2/2011 | Corrigan et al. |
| 2011/0027418 A1 | 2/2011 | Horgan et al. |
| 2011/0027419 A1 | 2/2011 | Sunvold et al. |
| 2012/0003182 A1 | 1/2012 | Abderrahim et al. |
| 2012/0003340 A1 | 1/2012 | Malnoe et al. |
| 2014/0030382 A1 | 1/2014 | Ter Haar |
| 2016/0073659 A1 | 3/2016 | Zemel et al. |
| 2016/0198742 A1 | 7/2016 | Villagran et al. |
| 2016/0249646 A1 | 9/2016 | Sunvold et al. |

FOREIGN PATENT DOCUMENTS

| | | |
|---|---|---|
| EP | 0594258 | 1/1999 |
| EP | 01036512 A1 | 9/2000 |
| EP | 1932432 A1 | 6/2008 |
| EP | 2060190 | 5/2009 |
| EP | 1533369 | 3/2011 |
| FR | 2634187 A1 | 1/1990 |
| FR | 2006/000010735 | 12/2006 |
| GB | 799676 | 8/1958 |
| GB | 1465267 | 5/1973 |
| GB | 2205476 A | 12/1988 |
| JP | S48-018062 | 6/1973 |
| JP | S57-026551 | 2/1982 |
| JP | 57206338 A2 | 12/1982 |
| JP | S61212267 | 9/1986 |
| JP | H 2-265458 A | 10/1990 |
| JP | 6040464 A2 | 2/1994 |
| JP | 6040472 A2 | 2/1994 |
| JP | H07799 | 1/1995 |
| JP | 2002-523027 | 7/2002 |
| RU | 2251364 | 5/2005 |
| WO | 89/05849 A1 | 6/1989 |
| WO | 9217072 | 10/1992 |
| WO | 95/07090 A1 | 3/1995 |
| WO | 97/16077 A1 | 5/1995 |
| WO | 95/17103 A1 | 6/1995 |
| WO | 95/34214 A1 | 12/1995 |
| WO | 9843682 | 10/1998 |
| WO | 99/09839 A1 | 3/1999 |
| WO | 0010405 | 3/2000 |
| WO | 2000/041576 A1 | 7/2000 |
| WO | 2000/047062 A2 | 8/2000 |
| WO | 2001/017365 A1 | 3/2001 |
| WO | 2004/074496 A1 | 9/2001 |
| WO | 2003/018778 A2 | 3/2003 |
| WO | 2004071324 | 8/2004 |
| WO | 05/047255 A1 | 5/2005 |
| WO | 2005/070232 A1 | 8/2005 |
| WO | 2005/092116 A1 | 10/2005 |
| WO | 2006/064959 A1 | 6/2006 |
| WO | 2006058373 | 6/2006 |
| WO | 2006061576 | 6/2006 |
| WO | 2006/122196 A2 | 11/2006 |
| WO | 2006/124675 A2 | 11/2006 |
| WO | 2007/048104 A1 | 4/2007 |
| WO | 2007/060539 A2 | 5/2007 |
| WO | 2007/044968 A3 | 6/2007 |
| WO | 2007/079147 A2 | 7/2007 |
| WO | 2007100251 | 9/2007 |
| WO | 2007/126990 A2 | 11/2007 |
| WO | 2007/126990 A3 | 11/2007 |
| WO | 2008/035332 A1 | 3/2008 |
| WO | 2008/046625 A2 | 4/2008 |
| WO | 2008/076975 A1 | 6/2008 |
| WO | 2008/090270 A1 | 7/2008 |
| WO | 2008/092228 A1 | 8/2008 |
| WO | 2008/101508 A1 | 8/2008 |
| WO | 2008/112296 A1 | 9/2008 |
| WO | 2008/131906 A2 | 11/2008 |
| WO | 2009/061221 A2 | 5/2009 |
| WO | 2009/061222 A2 | 5/2009 |
| WO | 2009/077401 A1 | 6/2009 |
| WO | 2009138577 | 11/2009 |

OTHER PUBLICATIONS

Job Ubbink and Jessica Kruger Physical approaches for the delivery of active ingredients in foods. Trends in Food Science & Technology 17 (2006) 244-254.
All Office Actions, U.S. Appl. No. 12/533,030.
All Office Actions, U.S. Appl. No. 12/533,039.
All Office Actions, U.S. Appl. No. 12/533,042.
PCT International Search Report for International Application No. PCT/US2010/042107, dated Nov. 24, 2010—4 pages.
PCT International Search Report for International Application No. PCT/US2010/043694, dated Nov. 16, 2010—4 pages.
PCT International Search Report Appln. No. PCT/US2010/042038 dated Nov. 24, 2010.
PCT International Search Report issued in International Application No. PCT/US2010/042309, dated Nov. 24, 2010.
"All Bran Yogurt Bites Cereal", Product Picture downloaded from www.amazon.com, accessed Mar. 11, 2014.
"How Cereal Giant Kellogg's Keeps Its Product Pipeline Fresh", US News and World report, posted on May 7, 2006, accessed on May 2, 2011, http://www.usnews.com/usnews/bixtech/articles/060515/15best_print.htm.
All Office Actions, U.S. Appl. No. 12/473,378.
All Office Actions, U.S. Appl. No. 12/473,386.
All Office Actions, U.S. Appl. No. 12/473,417.
All Office Actions, U.S. Appl. No. 12/473,431.
All Office Actions, U.S. Appl. No. 12/473,486.
All Office Actions, U.S. Appl. No. 13/349,816.

(56) References Cited

OTHER PUBLICATIONS

PCT International Search Report for International Application No. PCT/US2010/035248, dated Jul. 21, 2010, 4 pages.
PCT International Search Report for International Application No. PCT/US2010/03551, dated Aug. 27, 2010, 4 pages.
PCT International Search Report for International Application No. PCT/US2012/021212, dated May 9, 2012, 5 pgs.
PCT International Search Report for International Patent Application No. PCT/US2013/050829, dated Sep. 30, 2013, 4 pages.
Evidentiary Reference downloaded from www.palatant.com on Apr. 1, 2016, 1.
Burdick, et al., "Heating by Microwave, Hot Air, and Flowing Stream to Eliminate Inoculated Salmonella", Poultry Feed Magazine, published Jan. 6, 1983.
Burdock, "Encyclopedia of food and color additives pages.", Encyclopedia of food and color additives, 1996 p. 967-968.
Burdock, et al., "Safety assessment of 2-ethyl-3,(5 or 6) dimethylpyrazine as a food ingredient", Regulatory Toxicology and Pharmacology 50 (2008) p. 303-312.
DARPRO Solutions, "Chicken Fat", Retrieved Mar. 30, 2015.
Foster, et al., "Food Standards by the AAFCO", Dog Food Standards by the AAFCO, Veterinary & Aquatic Services Department, Drs. Foster & Smith, published 2008.
Francis, "Extrusion Cooking", Encyclopedia of Food Science and Technology, 2nd Ed. 1999, vol. 2, pp. 702-703.
Meunier, et al., "Use of Rotary Fluidized-bed Technology for Development of Sustained-Release Plant Extracts Pellets: Potential Application for Feed Additive Delivery, J. Anim. Sci. 2006".
Reynolds, "Steam Cooker Enables Even, Safe Processing", Aug. 9, 2007, p. 1, FoodProductionDaily.com.
"Italian Seasoning Recipe", Accessed at http://allrecipes.com/recipe/34450/italian-seasoning-I/, Oct. 5, 2003, 2 pgs.
"Low Fat Bread Crumb", Accessed at http://www.food.com/recipe/low-fat-bread-crumb-chicken-329993, Oct. 10, 2008, 4 pgs.
Sinha, et al., "Handbook of Fruits and Fruit Processing", Chapter 12 Novel Food Additives, Jun. 2012 (2 pgs.).

\* cited by examiner

PROCESS FOR DUSTING ANIMAL FOOD

FIELD

Embodiments of the present invention relate generally to the field of pet food. Embodiments of the present invention more particularly, but not exclusively, relate to pet food kibbles having dusted on Probiotic microorganisms and processes and methods thereof.

BACKGROUND

Kibble-type animal feeds, such as dog and cat foods, are dried, ready-to-eat pet food products. The kibbles can be formed by an extrusion process where the kibble raw materials are extruded under heat and pressure to form the pelletized kibble form. Extrusion technology provides a cheap and efficient method for formulating animal feed kibbles, such as those having a starch matrix. During the extrusion process, the starch matrix typically becomes gelatinized under the extrusion conditions.

The defense mechanisms to protect the mammalian gastrointestinal (GI) tract from colonization by pathogenic bacteria are highly complex. The GI tracts of most mammals are colonized by native microflora and invasive pathogenic micro-organisms. In a healthy individual, these competing microflora are in a state of equilibrium. Modification of the intestinal microflora equilibrium can lead to or prevent many GI disorders, both in humans and other mammalian species, such as companion animals, including, for example, cats, dogs, and rabbits. The well being of companion animals is closely related to their feeding and GI health, and maintenance of the intestinal microflora equilibrium in these animals can result in healthier pets.

The number and composition of the intestinal microflora tend to be stable, although age and diet can modify it. Gastric activity, bile, intestinal peristalsis, and local immunity are factors thought to be important in the regulation of bacterial flora in the small intestine of human beings and various other mammals. Often, pet GI disorders, including those found in canines and felines, are linked to bacterial overgrowth and the production of enterotoxins by pathogenic bacteria. These factors disrupt the intestinal microflora equilibrium and can promote inflammation and aberrant immune response.

Research has begun to highlight some valuable strains of bacteria and their potential uses as Probiotic agents. Probiotics are typically considered to be preparations of live bacteria. Probiotic related substances include constituents of Probiotics, such as proteins or carbohydrates, or purified fractions of bacterial ferments. Probiotics and/or their constituents may promote mammalian health by preserving and/or promoting the natural microflora in the GI tract and reinforcing the normal controls on aberrant immune responses.

Thus, a desired goal of improving the health of companion animals by way of providing Probiotics to the animal exists. However, many of the ingredients can be costly, sensitive to effects of extrusion or other production methods, and/or sensitive to product stability, such as exposure to oxygen or moisture. Identifying new product forms and designs where these challenges are overcome would enable products to be made that satisfy the goal of consumers to provide improved health benefits to their companion animals. Thus, a need exists for improved Probiotic kibbles and kibble animal feeds for companion animals.

A manner of protecting these Probiotics, or even other active materials, from decomposition, hydrolysis, or oxidation can include incorporating the active materials into the food product at a step in the manufacturing process following the heating of the primary nutritional ingredients. In most present forms, the active materials can be carried in a carrier agent, and the carrier agent can serve as an oxygen and moisture barrier and can also provide stability to the active materials during any additional manufacture and storage of the food product. Common carrier agents can include fats, oils, and waxes.

Technical problems remain when utilizing carrier agents. Some of the technical problems when using a carrier agent include, but are not limited to, uneven coating, agglomeration of the food product, pelletization of the carrier agent, adhesion to the machinery, and combinations thereof. It can be desirable to develop a pet food product and process of manufacturing pet food products comprising active materials, such as Probiotics, that can eliminate some or many of these technical problems.

Thus, one of the need areas includes the easy delivery of the active, such as a Probiotic, to the pet. As mentioned, many ways and product forms currently exist, including encapsulating the Probiotics, providing coatings of materials and mixing with the Probiotics, applying Probiotics to a coating on a kibble, and many others, some of which are highlighted in WO 2008/076975. However, some of these methods have proven complex and costly.

SUMMARY

In one embodiment, a process for dusting a pet food kibble is provided. The process can comprise providing a kibble and a powder and dusting the powder onto the kibble. The powder can comprise an active ingredient. The dusting can occur substantially free of a binder. The kibble can comprise less than 12% moisture during dusting. The active ingredient can comprise Probiotic microorganisms.

In another embodiment, a process for dusting a pet food kibble is provided that can comprise providing a pet food kibble in the form of a core matrix, wherein the core matrix can comprise a carbohydrate source comprising a gelatinized starch matrix, a protein source, and a fat source, providing a powder comprising a first component, wherein the first component can comprise Probiotic microorganisms, and dusting the powder onto the core matrix, wherein the dusting can occur substantially free of a binder.

In another embodiment, a process for dusting a pet food kibble is provided that can comprise providing a protein source, a carbohydrate source, and a fat source; extruding the protein source, the carbohydrate source, and the fat source into a pet food kibble in the form of a core matrix comprising a gelatinized starch; providing a powder comprising Probiotic microorganisms, and dusting the powder onto the core matrix to form a dusted kibble. The dusting can occur substantially free of a binder.

DETAILED DESCRIPTION

Definitions

As used herein, the articles including "the", "a", and "an", when used in a claim or in the specification, are understood to mean one or more of what is claimed or described.

As used herein, the terms "include", "includes", and "including" are meant to be non-limiting.

As used herein, the term "plurality" means more than one.

As used herein, the term "micrometers" is synonymous with microns.

As used herein, the term "kibble" includes a particulate pellet like component of animal feeds, such as dog and cat feeds, typically having a moisture, or water, content of less than 12% by weight. Kibbles may range in texture from hard to soft. Kibbles may range in internal structure from expanded to dense. Kibbles may be formed by an extrusion process. In non-limiting examples, a kibble can be formed from a core and a dusting to form a kibble that is dusted, also called a dusted kibble. It should be understood that when the term "kibble" is used, it can refer to an undusted kibble or a dusted kibble. The kibble can comprise a gelatinized starch matrix. The kibble can alternatively, or additionally, comprise a protein-based core matrix. Variations of the kibble are disclosed herein.

As used herein, the terms "animal" or "pet" mean a domestic animal including, but not limited to domestic dogs, cats, horses, cows, ferrets, rabbits, pigs, and the like. Domestic dogs and cats are particular examples of pets.

As used herein, the terms "animal feed", "animal feed compositions", "animal feed kibble", "pet food", or "pet food composition" all mean a composition intended for ingestion by a pet. Pet foods can include, without limitation, nutritionally balanced compositions suitable for daily feed, as well as supplements and/or treats, which can or may not be nutritionally balanced.

As used herein, the terms "Probiotic", "Probiotic component", "Probiotic ingredient", or "Probiotic microorganism" mean bacteria or other microorganisms, typically preparations of live bacteria, including those in the dormant state, that are capable of promoting mammalian health by preserving and/or promoting the natural microflora in the GI tract and reinforcing the normal controls on aberrant immune responses. Probiotics can include constituents of Probiotics, such as proteins or carbohydrates, or purified fractions of bacterial ferments.

As used herein, the term "nutritionally balanced" means that the composition, such as pet food, has known required nutrients to sustain life in proper amounts and proportion based on recommendations of recognized authorities, including governmental agencies, such as, but not limited to, United States Food and Drug Administration's Center for Veterinary Medicine, the American Feed Control Officials Incorporated, in the field of pet nutrition, except for the additional need for water.

As used herein, the term "core", or "core matrix", means the particulate pellet of a kibble and is typically formed from a core matrix of ingredients and has a moisture, or water, content of less than 12% by weight. The particulate pellet may be dusted to form a dusting on a core, which can be a dusted kibble. The core may be without a dusting, may be with a dusting completely surrounding the core, or may be with a dusting partially surrounding the core. In an embodiment without a dusting, the particulate pellet may comprise the entire kibble. Cores can comprise farinaceous material, proteinaceous material, and mixtures and combinations thereof. In one embodiment, the core can comprise a core matrix of protein, carbohydrate, and fat.

As used herein, the term "extrude" means an animal feed that has been processed by, such as by being sent through, an extruder. In one embodiment of extrusion, kibbles are formed by an extrusion processes wherein raw materials, including starch, can be extruded under heat and pressure to gelatinize the starch and to form the pelletized kibble form, which can be a core. Any type of extruder can be used, non-limiting examples of which include single screw extruders and twin-screw extruders.

As used herein, the term "substantially free" means that the kibble comprises less than 0.0005% by weight of the specific component, such as a binding agent or carrier that is used primarily for adhering the Probiotic microorganism as a dusting for delivery with a kibble (i.e. less than 5 parts per million).

As used herein, the term "water activity" is defined as the vapor pressure of water above a sample, such as a pet food, divided by that of pure water at the same temperature and generally refers to the amount of free water available to participate in chemical reactions. Water activity is often times represented by the mathematical equation $a_w = p/p_0$, where p is the vapor pressure of water in the sample, and $p_0$ is the vapor pressure of pure water at the same temperature.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All lists of items, such as, for example, lists of ingredients, are intended to be lists of Markush groups. Thus, all lists can be read and interpreted as items "selected from the group consisting of" . . . list of items . . . "and combinations and mixtures thereof."

Referenced herein may be trade names for components including various ingredients utilized in the present disclosure. The inventors herein do not intend to be limited by materials under any particular trade name. Equivalent materials (e.g., those obtained from a different source under a different name or reference number) to those referenced by trade name may be substituted and utilized in the descriptions herein.

In the description of the various embodiments of the present disclosure, various embodiments or individual features are disclosed. As will be apparent to the ordinarily skilled practitioner, all combinations of such embodiments and features are possible and can result in preferred executions of the present disclosure. While various embodiments and individual features of the present invention have been illustrated and described, various other changes and modifications can be made without departing from the spirit and scope of the invention. As will also be apparent, all combinations of the embodiments and features taught in the foregoing disclosure are possible and can result in preferred executions of the invention.

Kibble

Kibble-type animal feeds, such as dog and cat foods, can be dried, ready-to-eat pet food products. The kibbles can be formed by an extrusion process where the kibble raw materials are extruded under heat and pressure to form the pelletized kibble form or core. Extrusion technology can provide an inexpensive and efficient method for formulating animal feed kibbles, such as those having a starch matrix. During the extrusion process, the kibble raw materials, which can comprise the starch matrix, typically results in the starch matrix becoming gelatinized under the extrusion conditions, forming a gelatinized starch matrix.

A process of manufacture of the pet food product can generally include mixing components to form a core material mixture, extruding the core material mixture to form a core pellet, drying the core pellet, and optionally applying a dusting component to the dried core pellet to form a food pellet, and packaging the food pellets. In one embodiment, the food pellet can be the final desired food product. In one embodiment, the food pellet can undergo dusting steps to form the food product as desired.

The components used to form a core material mixture can be any individual starting components, including, but not limited to, farinaceous material, proteinaceous material, and mixtures and combinations thereof. In one embodiment, the core material can include, but is not limited to, protein materials, starch materials, fiber materials, fat materials, mineral materials, vitamin materials, and mixtures and combinations thereof. Protein materials can include, but are not limited to, chicken meal, chicken, chicken by-product meal, lamb, lamb meal, turkey, turkey meal, beef, beef by-product, viscera, fish meal, entrails and combinations thereof. Starch materials can include, but are not limited to, cereals, grains, corn, wheat, rice, oats, corn grits, sorghum, grain sorghum, wheat bran, oat bran, amaranth, durum wheat, and mixtures and combinations thereof. Fiber materials can include, but are not limited to, fructooligosaccharides, beet pulp, mannanoligosaccharides, oat fiber, citrus pulp, carboxymethylcellulose, gums such as gum Arabic, guar gum, and carragan, apple and tomato pomaces, citrus fiber, fiber extracts, fiber derivatives, dried beet fiber, distillers dried grain solids, and mixtures and combinations thereof. Fat materials can include, but are not limited to, poultry fat, chicken fat, turkey fat, pork fat, lard, tallow, beef fat, vegetable oils, corn oil, soy oil, cotton pellet oil, rape pellet oil, fish oil, menhaden oil, anchovy oil, palm oil, palm kernel oil, coconut oil, and mixtures and combinations thereof, and partially or fully hydrogenated versions of any of the aforementioned oils. Mineral materials can include, but are not limited to, sodium selenite, monosodium phosphate, calcium carbonate, potassium chloride, ferrous sulfate, zinc oxide, manganese sulfate, copper sulfate, manganese oxide, potassium iodide, cobalt carbonate, and mixtures and combinations thereof. Vitamin materials can include, but are not limited to, choline chloride, vitamin E supplement, ascorbic acid, vitamin A acetate, calcium pantothenate, pantothenic acid, biotin, thiamine mononitrate, vitamin B12 supplement, niacin, riboflavin supplement, inositol, pyridoxine hydrochloride, vitamin D3 supplement, folic acid, vitamin C, mixtures and combinations thereof. In one embodiment, the core material can comprise additional components including, but not limited to, beef broth, brewers dried yeast, egg, egg product, flax meal, amino acids such as DL methionine, leucine, lysine, tryptophan, arginine, cysteine, aspartic acid, taurine, and mixtures and combinations thereof.

One embodiment of the present invention provides a pet food in the form of a dusted kibble comprising a core, which can be extruded as described above, a dusting dusted onto the core. In one embodiment, the core can comprise from 50% to 100% of the entire dusted kibble. In one embodiment, the core can have a moisture content less than 12% and can comprise a gelatinized starch matrix, which can be formed by way of the extrusion process described herein. In one embodiment, the core can be nutritionally balanced.

In one embodiment, the dusted kibble comprises a core and a dusting. The core can comprise several ingredients that form a core matrix. In one non-limiting example, the core can comprise a carbohydrate source, a protein source, and/or a fat source. In one embodiment, the core can comprise from 20% to 100% of a carbohydrate source. In one embodiment, the core can comprise from 0% to 80% of a protein source.

In one embodiment, the core can comprise from 0% to 15% of a fat source. The core can also comprise other ingredients as well. In one embodiment, the core can comprise from 0% to 80% of other ingredients.

The carbohydrate source, or starch ingredient or materials, can, in non-limiting examples, comprise cereals, grains, corn, wheat, rice, oats, corn grits, sorghum, grain sorghum/milo, wheat bran, oat bran, amaranth, Durum, and/or semolina. The protein source, ingredient, or materials, can, in non-limiting examples, comprise chicken meals, chicken, chicken by-product meals, lamb, lamb meals, turkey, turkey meals, beef, beef by-products, viscera, fish meal, enterals, kangaroo, white fish, venison, soybean meal, soy protein isolate, soy protein concentrate, corn gluten meal, corn protein concentrate, distillers dried grains, and/or distillers dried grains solubles. The fat source, ingredient, or materials, can, in non-limiting examples, comprise poultry fat, chicken fat, turkey fat, pork fat, lard, tallow, beef fat, vegetable oils, corn oil, soy oil, cottonseed oil, palm oil, palm kernel oil, linseed oil, canola oil, rapeseed oil, fish oil, menhaden oil, anchovy oil, and/or olestra.

According to one embodiment, a core can comprise a protein-based core matrix that can be greater than 70% by weight of a vegetable protein, wherein the protein-based core is substantially free of a matrix of gelatinized starch. In specific embodiments, the protein-based core matrix may comprise greater than 80% by weight of a vegetable protein. In still other embodiments the protein-based core matrix may comprise greater than 85%, 90% or even 95% by weight of a vegetable protein. Specific examples of vegetable proteins include any vegetable derived protein that is substantially free or can be modified or manufactured to be substantially free of gelatinized starch. Examples of vegetable proteins suitable for use in the various embodiments of the present disclosure include, but are not limited to, distiller's dried grains ("DDG"), distiller's dried grain solubles ("DDGS"), corn protein concentrate ("CPC"), corn gluten meal ("COM"), soy protein isolate ("SPI"), soy protein concentrate ("SPC"), wheat gluten ("WG"), rice protein isolate ("RPI"), rice protein concentrate ("RPC"), sorghum protein concentrate ("SorgPC"), oat protein concentrate ("OPC"), barley protein concentrate ("BPC"), and combinations of any thereof.

In specific embodiments, the core can comprise from 25% to 99.99% by weight of the core matrix. In other embodiments, the core can comprise from 50% to 99% by weight of the core matrix. Specific embodiments of the cores can include a core matrix that may further comprise one or more other ingredients, such as ingredients that may improve processing, stability, and/or palatability, or provide specific nutritional requirements. For example, the core matrix may further comprise at least one of corn syrup solids, minerals, vitamins, prebiotics (e.g., fructo-oligosaccharides, oligofructosaccharides, inulin, chicory, xylo-oligosaccharides, mannanoligo saccharides, lactosucrose, galacto-oligosaccharides, or resistant starch), vegetable oils, animal fats, fish oils, mineral oils, amino acids, fibers, animal proteins, fish proteins, emulsifiers, processing aids, humectants, and dextrins.

In many applications, starch can be added to the protein component of the core feed to improve stability, such as by holding the components in the kibble form. In certain applications, it may be desirable to provide a kibble that is substantially free of starch. However, formulation of a kibble, such as a protein based kibble without starch is not straight forward since the kibble stability without starch is reduced. The inventors of the various embodiments of the present disclosure have developed methodologies to produce an extruded protein-based core matrix kibble that is substantially free of a matrix of gelatinized starch and where the kibble is greater than 70% by weight of a vegetable protein. Thus, one embodiment of the present disclosure provides a protein-based core matrix, wherein the protein-based core is substantially free of a gelatinized starch matrix. Specific embodiments may comprise a protein-based core that has less than 5%, 2%, 1%, or even 0.5% by weight of gelatinized starch. Still other embodiments, the protein-based core matrix may be essentially free of gelatinized starch. As used herein, the term "essentially free" when used in reference to concentration of a specific component in a composition means less than a measurable amount using methods of concentration measurements common in the art.

Other ingredients can, in non-limiting examples, comprise active ingredients, such as sources of fiber ingredients, mineral ingredients, vitamin ingredients, polyphenols ingredients, amino acid ingredients, carotenoid ingredients, antioxidant ingredients, fatty acid ingredients, glucose mimetic ingredients, Probiotic ingredients, prebiotic ingredients, and still other ingredients, any of which can be considered a first component, a second component, a third component, etc. (out to any number of components). Suitable other actives can include biologics, for example, but not limited to, biologics selected from the group consisting of enzymes, antibodies, immunoglobulins, cytokines, epigenetic agents, vitamins, and Probiotic microorganisms, and mixtures and combinations of these. Sources of fiber ingredients can, in non-limiting examples, include fructooligosaccharides (FOS), beet pulp, mannanoligosaccharides (MOS), oat fiber, citrus pulp, carboxymethylcellulose (CMC), guar gum, gum arabic, apple pomace, citrus fiber, fiber extracts, fiber derivatives, dried beet fiber (sugar removed), cellulose, α-cellulose, galactooligosaccharides, xylooligosaccharides, and oligo derivatives from starch, inulin, chicory, psyllium, pectins, citrus pectin, guar gum, xanthan gum, alginates, gum arabic, gum talha, beta-glucans, chitins, lignin, celluloses, non-starch polysaccharides, carrageenan, reduced starch, soy oligosaccharides, trehalose, raffinose, stachyose, lactulose, polydextrose, oligodextran, gentioligosaccharide, pectic oligosaccharide, and/or hemicellulose. Sources of mineral ingredients can, in non-limiting examples, include sodium selenite, monosodium phosphate, calcium carbonate, potassium chloride, ferrous sulfate, zinc oxide, manganese sulfate, copper sulfate, manganous oxide, potassium iodide, and/or cobalt carbonate. Sources of vitamin ingredients can, in non-limiting examples, include choline chloride, vitamin E supplement, ascorbic acid, vitamin A acetate, calcium pantothenate, pantothenic acid, biotin, thiamine mononitrate (source of vitamin B1), vitamin B12 supplement, niacin, riboflavin supplement (source of vitamin B2), inositol, pyridoxine hydrochloride (source of vitamin B6), vitamin D3 supplement, folic acid, vitamin C, and/or ascorbic acid. Sources of polyphenols ingredients can, in non-limiting examples, include tea extract, rosemary extract, rosemarinic acid, coffee extract, caffeic acid, turmeric extract, blueberry extract, grape extract, grapeseed extract, and/or soy extract. Sources of amino acid ingredients can include 1-Tryptophan, Taurine, Histidine, Carnosine, Alanine, Cysteine, Arginine, Methionine, Tryptophan, Lysine, Asparagine, Aspartic acid, Phenylalanine, Valine, Threonine, Isoleucine, Histidine, Leucine, Glycine, Glutamine, Taurine, Tyrosine, Homocysteine, Ornithine, Citruline, Glutamic acid, Proline, peptides, and/or Serine. Sources of carotenoid ingredients can include lutein, astaxanthin, zeaxanthin, bixin, lycopene, and/or beta-carotene. Sources of antioxidant ingredients can, in non-limiting examples, include tocopherols (vitamin E), vitamin C, vitamin A, plant-derived materials, carotenoids (described above), selenium, and/or CoQ10 (Co-enzyme Q10). Sources of fatty acid ingredients can include arachidonic acid, alpha-linoleic acid, gamma linolenic acid, linoleic acid, eicosapentanoic acid (EPA), docosahexanoic acid (DHA), and/or fish oils as a source of EPA and/or DHA. Sources of glucose mimetic ingredients can include glucose anti-metabolites including 2-deoxy-D-glucose, 5-thio-D-glucose, 3-O-methylglucose, anhydrosugars including 1,5-anhydro-D-glucitol, 2,5-anhydro-D-glucitol, and 2,5-anhydro-D-mannitol, mannoheptulose, and/or avocado extract comprising mannoheptulose. Still other ingredients can, in non-limiting examples, include beef broth, brewers dried yeast, egg, egg product, flax meal, DL methionine, amino acids, leucine, lysine, arginine, cysteine, cystine, aspartic acid, polyphosphates such as sodium hexametaphosphate (SHMP), sodium pyrophosphate, sodium tripolyphosphate; zinc chloride, copper gluconate, stannous chloride, stannous fluoride, sodium fluoride, triclosan, glucosamine hydrochloride, chondroitin sulfate, green lipped mussel, blue lipped mussel, methyl sulfonyl methane (MSM), boron, boric acid, phytoestrogens, phytoandrogens, genistein, diadzein, L-carnitine, chromium picolinate, chromium tripicolinate, chromium nicotinate, acid/base modifiers, potassium citrate, potassium chloride, calcium carbonate, calcium chloride, sodium bisulfate; eucalyptus, lavender, peppermint, plasticizers, colorants, flavorants, sweeteners, buffering agents, slip aids, carriers, pH adjusting agents, natural ingredients, stabilizers, biological additives such as enzymes (including proteases and lipases), chemical additives, coolants, chelants, denaturants, drug astringents, emulsifiers, external analgesics, fragrance compounds, humectants, opacifying agents (such as zinc oxide and titanium dioxide), anti-foaming agents (such as silicone), preservatives (such as butylated hydroxytoluene (BHT) and butylated hydroxyanisole (BHA), propyl gallate, benzalkonium chloride, EDTA, benzyl alcohol, potassium sorbate, parabens and mixtures thereof), reducing agents, solvents, hydrotropes, solublizing agents, suspending agents (non-surfactant), solvents, viscosity increasing agents (aqueous and non-aqueous), sequestrants, and/or keratolytics.

Thus, a pet food in the form of a kibble can be formed as a core matrix. Upon forming the core matrix as a pellet, and before addition of any dusting, the core matrix can be uncovered or undusted in that the core can be substantially without any dusting materials and thus have a surface, wherein the surface can be free of dusting materials or components. At this stage, dusting materials, or dustings as described above, can be applied to the surface of the core as described hereinafter. In other embodiments, the core can be coated or otherwise have other ingredients applied followed by the application of a dusting. Thus, the dusting can, in one embodiment, not be in direct contact with the core.

Dustings

Embodiments of the present disclosure can comprise animal feed kibbles comprising a kibble comprising a core matrix, as described herein, and a dusting. The dusting can comprise at least one active ingredient dusting on the surface of the core matrix and can be referenced as an active dusting, or a dusting comprising actives, or active components. Suitable actives are disclosed herein and include, for example, but not limited to, enzymes, antibodies, immunoglobulins, cytokines, epigenetic agents, vitamins, and Probiotic microorganisms and materials. Additionally, the dusting can comprise any of the active ingredients listed herein.

In specific embodiments, the active dusting can comprise at least one Probiotic enriched dusting. The Probiotic enriched dusting can, in non-limiting examples, comprise a Probiotic selected from the group consisting of a Probiotic component having a Probiotic microorganism activity of at least $10^5$ CFU/gram, yeast, enzymes, antibodies, immunoglobulins, cytokines, epigenetic agents, and mixtures and combinations thereof. In other embodiments, the Probiotic can be measured in reference to the weight of the kibble. As used herein, the terms Probiotic, Probiotic ingredient, Probiotic microorganism, and Probiotic agent are all used synonymously and interchangeably.

The Probiotic-enriched dusting according to some embodiments can, in non-limiting examples, comprise one or more bacterial Probiotic microorganism suitable for pct consumption and effective for improving the microbial balance in the pet gastrointestinal tract or for other benefits, such as disease or condition relief or prophylaxis, to the pet. Various Probiotic microorganisms known in the art can be suitable for use in the present invention. See, for example, WO 03/075676, and U.S. Published Application No. US 2006/0228448A1. In specific embodiments, the Probiotic component can be selected from bacteria, yeast or microorganism of the genera *Bacillus, Bacteroides, Bfidobacterium, Enterococcus* (e.g., *Enterococcus faecium* DSM 10663 and *Enterococcus faecium* SF68), *Lactobacillus, Leuconostroc, Saccharomyces, Candida, Streptococcus*, and combinations and mixtures of any thereof. In other embodiments, the Probiotic can be selected from the genera *Bifidobacterium, Lactobacillus*, and combinations and mixtures thereof. Those of the genera *Bacillus* can form spores. In other embodiments, the Probiotic does not form a spore. In another embodiment, the Probiotic can be freeze-dried or lyophilized. Non-limiting examples of lactic acid bacteria suitable for use herein include strains of *Streptococcus lactis, Streptococcus cremoris, Streptococcus diacetylactis, Streptococcus thermophilus, Lactobacillus bulgaricus, Lactobacillus acidophilus* (e.g., *Lactobacillus acidophilus* strain DSM 13241), *Lactobacillus helveticus, Lactobacillus bifidus, Lactobacillus casei, Lactobacillus lactis, Lactobacillus plantarum, Lactobacillus rhamnosus, Lactobacillus delbrukii, Lactobacillus thermophilus, Lactobacillus fermentii, Lactobacillus salvarius*, l,actohacillus *reuteri, Bifidohacterium longum, Bifidohacterium infantis, Bifidohacterium bifidum, Bifidobacterium animalis, Bifidobacterium pseudolongum, Pediococcus cerevisiae*, and combinations and mixtures of any thereof. In specific embodiments, the Probiotic-enriched dusting can comprise the bacterial strain *Bifidobacterium animalis* AHC7 NCIMB 41199. Other embodiments of the Probiotic-enriched dusting can include one or more microorganisms identified in U.S. Published Application Nos. US 2005/0152884A1, US 2005/0158294A1, US 2005/0158293A1, US 2005/0175598A1, US 2006/0269534A1, US 2006/0270020A1, and PCT International Publication No. WO2005/060707A2.

In certain embodiments, the Probiotic dusting can have a viable Probiotic microorganism count of at least about $10^4$ colony forming units (CFU) per gram of the kibble, or at least about $10^5$ CFU per gram of kibble, or at least about $10^7$ CFU per gram of kibble. For example, the dusting can have a viable Probiotic microorganism count of up to about $10^{14}$ CFU per gram of kibble, or up to $10^{11}$ CFU per gram of kibble, or up to about $10^9$ CFU per gram of kibble, or up to about $10^8$ CFU per gram of kibble. Enumeration as defined by CFU is determined using methods such as disclosed in U.S. Publication No. US 2006/0228448A1. Advantageously, the Probiotic dustings provided herein having a shelf life of at least about three months, alternatively at least about six months, alternatively from about three months to about twenty-four months, alternatively from about six months to about eighteen months. In specific embodiments, the Probiotic dustings can have a shelf life of at least 16 months. As used herein, the term "shelf life" refers to that property of the second component whereby about 1% or more, alternatively about 5% or more, alternatively about 10% or more, alternatively about 25% or more, alternatively about 50% or more, alternatively about 75% or more, of the Probiotic microorganisms of the Probiotic dusting are viable at the referenced time period after exposure to ambient environmental conditions.

In specific embodiments, the active or Probiotic-enriched dusting can comprise a yeast. Any of a variety of yeast can be utilized, and will be well-known in the art, such as those of the *Saccharomyces* genera (including, for example, *Saccharomyces cervisiae* (sometimes referred to as "Baker's yeast"), and *Candida utilis* (which can also be referred to as *Torulopsis utilis*). As used herein, yeast includes but is not limited to those incorporating one or more components incorporated from the environmental media upon which it is cultivated, such as mineral-enriched yeast. Various fermentation processes are well-known in the art.

In other embodiments, the active or Probiotic-enriched dusting can comprise one or more enzymes. Enzymes particularly include those having beneficial biological activity in a pet, such as digestive or other therapeutic enzymes. Non-limiting examples include proteases, collagenases, lipases, amylases, cellulases, lysozymes, candidases, lactases, kinases, invertases, galactosidases, pectinases, ribonucleases (including deoxyribonucleases) and combinations and mixtures thereof.

In other embodiments, the active or Probiotic-enriched dusting can comprise one or more antibodies. Antibodies to viruses, pathogenic bacteria, parasites, or the like can be used in the dustings herein. Non-limiting examples include antibodies to feline rhinotracheitis, feline panleukopenia, feline calicivirus, feline pneumonitis, feline leukemia, canine distemper, canine parvovirus, coronavirus, *Borrelia burgdorferi* (Lyme Disease), *Toxoplasma gondii, E. coli, campylobacter, salmonella, clostridia, bacteriodes, giardia*, tapeworm, roundworm, coccidian, cryptosporidium, and combinations and mixtures thereof.

In certain embodiments, the active or Probiotic-enriched dusting can comprise one or more immunoglobulins. Non-limiting examples include immunoglobulin A (IgA), immunoglobulin M (IgM), immunoglobulin G (IgG), and combinations thereof. In other embodiments, the Probiotic-enriched dusting can comprise one or more cytokines. Non-limiting examples include transforming growth factor beta (TGF-beta), tumor necrosis factor alpha (TNF-alpha), interleukin-4, interleukin-10, interleukin-12, and combinations and mixtures thereof.

The active or Probiotic-enriched dusting can also comprise a prebiotic. "Prebiotic" includes substances or compounds that are fermented by the intestinal flora of the pet and hence promote the growth or development of lactic acid bacteria in the gastro-intestinal tract of the pet at the expense of pathogenic bacteria. The result of this fermentation can include a release of fatty acids, in particular short-chain fatty acids in the colon. This result can have the effect of reducing the pH value in the colon. Non-limiting examples of suitable prebiotics include oligosaccharides, such as inulin and its hydrolysis products, oligofructose, fructo-oligo saccharides, short-chain fructo-oligosaccharides, chicory, galacto-oligosaccharides, xylo-oligosaccharides, or oligo derivatives of starch. The prebiotics can be provided in any suitable form. For example, the prebiotic can be provided in the form of plant material that contains the fiber. Suitable plant materials include asparagus, artichokes, onions, wheat or chicory, or residues of these plant materials. Alternatively, the prebiotic fiber can be provided as an inulin extract, for example extracts from chicory can be suitable. Suitable inulin extracts can be obtained from Orafti SA of Tirlemont 3300, Belgium under the trademark RAFTILINE. Alternatively, the fiber can be in the form of a fructo-oligosaccharide such as obtained from Orafti SA of Tirlemont 3300, Belgium under the trademark RAFTILOSE. Otherwise, the fructo-oligosaccharides can be obtained by hydrolyzing inulin, by enzymatic methods, or by using micro-organisms.

As mentioned above, the dusting can comprise a first component, such as an active as described above, which can be, but is not limited to, a Probiotic microorganism. In one embodiment, the first component can comprise the entire dusting such that the dusting is substantially free of other substances. In one embodiment, the dusting can comprise a second component, such as a second active as described above, which can be, but is not limited to, a vitamin. In still another embodiment, the dusting can comprise a third component, such as third active as described above, which can be, but is not limited to, a glucose mimetic. Other embodiments can include any number of components, such as additional actives as described above. Thus, the dusting can comprise any number of components, such as actives.

In one embodiment, the dusting and/or core can be free of or substantially free of a binding agent, binder, and/or carrier/carrier substrate for the dusting to be dusted on the core or other dustings in the case of multiple dustings. In one embodiment, a binder, binding agent, or carrier means a substance or composition that is used primarily for, or assisting in, securing, cohering, affixing, binding, adhering, or sticking a substance or composition to another substance or composition. For example, a fat ingredient, protein, water, and/or flavor coatings, among others as disclosed herein, can be used as a binder, binding agent, or carrier/carrier substrate for a Probiotic to adhere, or stick to, an animal feed, such as a pet food kibble. Thus, in one embodiment, a dusted kibble can comprise a core and a dusting, wherein substantially no binding agent, binder, or carrier is used. The dusting, as described herein, can in one non-limiting example comprise a Probiotic.

Dusting

In one embodiment, an active can be applied to a core using a dusting process, resulting in a dusted kibble. The active can comprise a Probiotic. While the dusting embodiment will be described in terms of dusting a Probiotic component onto a core, it should be understood that any ingredient conducive to dusting can be used and so the present Applicants are not meant to be limited to only Probiotics. Without being bound by theory, it is thought that Van der Waals forces provide for the appropriate adhesion between the Probiotic particles and the core such that the dusting comprising Probiotic particles can be substantially free of a binder or binding agent. Without being bound by theory, it is thought that the Van der Waals forces provide the attractive force between the dusting and the core. Additionally, and without being bound by theory, it is also thought that hydrogen bonds play a role in the adhesion. A hydrogen bond is the attractive force between a hydrogen atom covalently bonded to an electronegative atom, such as nitrogen, oxygen, and fluorine, and another electronegative atom of a separate molecule. The electronegative atoms have a greater electron pull making the vicinity around these atoms negatively charged. This uneven distribution of electrons makes the hydrogen region carry a positive charge allowing the dipole intermolecular interaction between the two molecules. The bond is stronger than Van der Waals bonds but weaker than covalent, intramolecular bonds. Most proteins and carbohydrates contain several groups which are able to form hydrogen bonds.

Thus, in one embodiment, the dusting can comprise Probiotics and be substantially free of a binder or binding agent. Thus, the dusting process can comprise dusting the dusting onto the core, wherein the dusting comprises Probiotics and is substantially free of a binder or binding agent.

In one embodiment of the present invention, a process for dusting a pet food kibble comprises providing a pet food kibble in the form of a core matrix having a surface, providing a powder comprising a first component, dusting the powder onto the surface of the pet food kibble or core matrix, or kibble, wherein the dusting occurs substantially free of a binding agent or carrier. As used herein, the term "dusting" or "dusted" or "to dust" means to apply with a powder, fine particle, or dust-like material, such as applying a powder comprising Probiotic microorganisms, and/or its constituents, and/or any stability/preservative aids, that are in the form of solid particles. In one embodiment, dusting can be a dry mixing of a powder, such as an active such as a Probiotic, onto an animal food, such as a kibble as disclosed herein. The dry mixing process can also be performed substantially free of a binder, binding agent, and/or carrier substrate, as disclosed herein. Dusting can be performed in one embodiment such that its purpose can ensure substantially homogenous application throughout a group of kibbles being dusted. In one embodiment, most or substantially all of the surface area of a kibble can be exposed to the Probiotic powder. In one embodiment, distribution of the powder can be substantially even over the surface of a kibble. As used herein, dusting can be with the intent to disperse the powder, or dust, over at least the majority of the surface. In one embodiment of dusting, a mechanical mixer can be used, as disclosed herein. Sprinkling, on the other hand, can be scattered or random arrangement of the powder on the kibbles and does not expose substantially all of the surface area of the kibble to the powder. Sprinkling also is a form of topical application over only a portion or a limited surface of a substance. Additionally, sprinkling is usually a manual operation, such as a human sprinkling powder over a mass of animal food. In one embodiment, when comparing sprinkling to dusting, dusting results in a much higher level of adhesion of the powder then does sprinkling. Dusting of the Probiotic microorganisms can occur using a mixture, such as a mixture in a powder form that can be applied with mixing equipment as described herein to ensure near homogenous application throughout a batch of kibbles. Thus, the mixture or powder can comprise a count of Probiotic microorganisms, which can be only Probiotic microorganisms or can be mixed with another ingredient or ingredients, such as a stability aid and/or preservative aid, as described herein. In certain non-limiting examples, including embodiments as disclosed herein, the Probiotic powder can comprise between about 1 gram per 10,000,000 grams of kibble to about 1 gram per 10 grams of kibble, and all whole numbers ranges therebetween. These weights of powder can include the stability aids and preservative aids as described herein, such as maltodextrin and ascorbic acid, for example. In some embodiments, the dusting can be substantially even over the surface of the core. In other embodiments, the dusting is not substantially even over the surface of the core.

Additionally, in one embodiment of the present invention, the dusting can occur substantially free of a binder, binding agent, or carrier substrate. In one embodiment, the binder, binding agent, or carrier substrate does not include the particles or constituents included in the Probiotic powder, such as the stability and/or preservative aids as described herein. In other embodiments, the Probiotic powder can be substantially free of the stability and/or preservative aids. In one embodiment, substantially free of means less than 5 parts per million of the dusting. Non-limiting examples of binders, binding agents, and carriers can include liquefied agents that are applied to the surface of a kibble for the use of adhering dried particulates or substances. Non-limiting examples can include fats and fat matrices such as, but not limited to, soybean oil, cottonseed oil, poultry fat, tallow, partially hardened fats, winterized fats, partial glycerides such as mon-, di-, and triglycerides and mixtures and combinations thereof; waxes; proteins or proteinaceous materials such as, but not limited to, chicken broth, whey, egg white, hydrolyzed proteins, corn zein, and gelatin; sugars and sugar matrices; starches and/or modified starches, and/or. These binders can typically be applied to a surface using a liquid or solvent that the binder is dissolved or suspended in.

It should be understood that the Probiotic powder that can be dusted can include stability and/or preservative aids. Stability aids can be considered to scavenge free water. Preservative aids can be considered to scavenge free radicals. For example, in the case of Probiotics, the powder can contain stability aids, such as, but not limited to, maltodextrin and/or sugars, and/or preservative aids, such as, but not limited to, ascorbic acid. Thus, in one embodiment, the powder comprises Probiotic microorganisms, a stability aid, and a preservative aid. In one embodiment, the powder can comprise 100% Probiotic microorganism. In another embodiment, the powder can comprise between about 50% and about 99% Probiotics, between about 60% and about 90% Probiotics, between about 65% and about 85% Probiotics, between about 65% and about 75% Probiotics, between about 1% and 50% stability aid, between about 10% and 40% stability aid, between about 15% and 35% stability aid, between about 25% and 35% stability aid, non-limiting example such as maltodextrin, and between about 0% and about 5% preservative aid, between about 0% and about 3% preservative aid, between about 0% and about 2% preservative aid, between about 0.5% and about 1.5% preservative aid, non-limiting example such as ascorbic acid, and all combinations and mixtures thereof, including all ranges therebetween. These stability aids and preservative aids, in one embodiment, are not considered binders, binding agents, or carriers, and no additional carrier or binder is being added to the powder for the purpose of binding, such as binding to the pet food kibble. These stability and/or preservative aids can be added for the stability of the Probiotic microorganism. Thus, in one embodiment, the dusting powder contains greater than 20% Probiotic with a CFU that can be greater than $10^9$ CFU per gram, $10^{11}$ CFU per gram, and greater than $10^{13}$ CFU per gram. In another embodiment, the powder can comprise Probiotic microorganisms, maltodextrin, and ascorbic acid.

The particle size of each Probiotic microorganism, or mixture in powder form, can be any size that results in adherence of at least one Probiotic microorganism, for however long, to the base material, such as the core matrix of a kibble. In one embodiment, a mixture of Probiotic microorganisms can comprise Probiotic microorganisms having a particle size of less than 100 micrometers. In one embodiment, a mixture of Probiotic microorganisms can comprise Probiotic microorganisms having a particle size of less than 75 micrometers. In one embodiment, a mixture of Probiotic microorganisms can comprise Probiotic microorganisms having a particle size of less than 75 micrometers but greater than 10 micrometers. In another embodiment, a mixture of Probiotic microorganisms can comprise Probiotic microorganisms having varying particle sizes, such as a portion less than 100 micrometers and a portion greater than 100. In at least one embodiment, the portion of Probiotic microorganisms having a particle size greater than 500 micrometers may not be conducive to dusting in that adherence to a kibble does not readily or easily occur. In any of these embodiments, the mixture of Probiotic microorganisms can include Probiotic microorganisms having particle sizes outside of the specific range or can include only Probiotic microorganisms having particle sizes only within the specific range. Particle sizes conducive to dusting can include particle sizes such as less than 500 micrometers, less than 400 micrometers, less than 300 micrometers, less than 200 micrometers, less than 100 micrometers, and as low as 10 micrometers, and all ranges therebetween. In one embodiment, the particle size can be from 10 micrometers to 75 micrometers.

With further reference to size, and appreciating that in some embodiments particle sizes can take multiple shapes, irregular shapes, and dimensions, whenever the size of the particles is discussed, it should be understood that the sizes can be determined or measured by way of mesh screens using ASTM E 11-70 (1995). Thus, the less than 75 microns size as described herein can be determined by those particles that pass through a No. 200 mesh. Accordingly, the appropriate mesh size can be used to determine or measure the particle size as needed as described herein.

To assist in understanding particle sizes of the Probiotic microorganisms described herein, the following description is provided. The Probiotic powder can be made, in one embodiment, by fermenting the Probiotic bacteria in a nutrient-rich broth in very large stirred tanks. When the fermentation is complete, the broth is dried off, until only a solid remains. This solid is then ground up to a powder, which can be freeze dried, or lyophilized, and which can be used in embodiments of the present invention disclosed herein for dusting. This powder can be the dried fermentation broth and can have nutrients, bacteria byproducts, and/or dormant Probiotic bacteria/microorganisms. The powder can contain stability aids, such as, but not limited to, maltodextrin and/or sugars, and/or preservative aids, such as, but not limited to, ascorbic acid. Thus, in one embodiment, only a portion of the powder comprises Probiotic microorganisms. Additionally, the powder particles generally can be comprised of irregular shape particles and measured or determined as described herein. It should be understood that the above is only one process of making a Probiotic, and any Probiotic that is conducive to dusting can be used, no matter the process of making it.

In one embodiment, the mixture to be dusted can comprise any of the other and/or active ingredients as described herein. Other ingredients can, in non-limiting examples, comprise active ingredients, such as sources of fiber ingredients, mineral ingredients, vitamin ingredients, polyphenols ingredients, amino acid ingredients, carotenoid ingredients, antioxidant ingredients, fatty acid ingredients, glucose mimetic ingredients, Probiotic ingredients, prebiotic ingredients, and mixtures or combinations thereof. The mixture to be dusted can comprise particles of the appropriate size that are best suitable for dusting such that they adhere to the kibble.

Thus, various other embodiments of the animal feed kibbles described herein can further comprise at least one additional active that can be dusted. The additional active can also be coated, in one embodiment, using a binder. For example, the at least one additional dusting or coatings can include one or more dustings or coatings containing additional active ingredients (including those described herein) or one or more Probiotic-enriched coatings or dustings. In other embodiments, the one or more additional coatings or dustings can comprise only the coating material, wherein the one or more additional dustings or coatings can increase the stability of the food composition.

It should be understood that although within this disclosure sizes of Probiotics particles are disclosed, those sizes in no way are meant to be limiting in that any size of particles can be used for dusting. Moreover, any mixtures of sizes of particles can be used. Thus, the mixture can include particles of multiple sizes. Mixtures can include particles of substantially the same size or of differing sizes, all or some of which are conducive to dusting. Other mixtures can include particles of the mixture that can be conducive to dusting while other particles of the mixture may not be conducive to dusting. Of course, different types of particles can be used, as described herein.

Thus, embodiments of the present invention can comprise adhering a solid Probiotic microorganism, or any other active, onto a kibble, such as by dusting the Probiotic microorganism onto the surface of the kibble core substantially without the use of a binding agent or carrier to form a dusted kibble. In one embodiment, the dusted kibble comprises a kibble comprising a core matrix, as described hereinabove, a powder comprising Probiotic microorganism particles, wherein the powder comprises a dusting on the core matrix to form a dusted pet food kibble that is substantially free of a binder, binding agent, and/or carrier. In one embodiment, the dusting adheres to the surface of the kibble. However, it should be understood that the surface of a kibble is generally not a uniform, smooth surface. In most circumstances, the surface of a kibble can be generally rough and thus have many nooks, depressions, recesses, indentions, impressions, and the like. Thus, in at least one embodiment, when the powder described herein is dusted onto the kibble, the particles of the powder can adhere to not only the surface of the kibble but also into these nooks, depression, recesses, indentions, impressions, and the like.

As described above, in one embodiment, the kibble can be substantially free of a binder, binding agent, or carrier. Thus, in this embodiment, the dusting can be performed substantially without the use of a binder, binding agent, or carrier for use in binding or in adhering the Probiotic microorganisms to the kibble. Binders or carriers can typically be used for assisting in adhering or protecting the active ingredient, such as Probiotic microorganisms, to the kibble. For example, a fat coating can be applied to the core, which can assist in applying the Probiotic microorganisms in that the core has been made more receptive to receiving and adhering the Probiotic microorganisms since it is more adhesive from the properties of the fat. Alternatives include encapsulation of the Probiotic microorganisms, other coatings, carriers in the Probiotic mixture that adhere to the coating of the core, among others.

Thus, in embodiments wherein the dusting can be substantially free of a binder or carrier agent, many variables exist that can affect the adhesion properties of the powder during the dusting process. Moreover, without being limited to theory, it is thought that many of the variables can be adjusted, either during the dusting process or to the core itself, to result in a commercially feasible pet food kibble having a dusting of powder. Among the variables that can affect adhesion properties of the powder can be the particle size of particles in the powder, the surface area of the core that is available for powder adhesion, temperature of the core when dusting, surface roughness of the core, amount of powder that is used, the method of application of the powder to the core, electrostatic charges, and the relative humidity of the local environment at the time of powder application to the core. Each of these variables is now taken in turn.

As described above, in one embodiment, the particle size of the particles in the powder can affect the adhesion properties of the powder onto the core. In one embodiment, the powder can comprise Probiotic microorganisms having a particle size less than 100 micrometers. In another embodiment, the powder can comprise Probiotic microorganism having a particle size less than 75 micrometers. In one embodiment, the Probiotic microorganism can have a particle size of between about 10 micrometers and about 75 micrometers. In any of these embodiments, the Probiotic powder, which can contain stability aids and/or preservative aids, can also have particles sizes that match the particles sizes for Probiotics, as described herein. As described before, particle size is defined as particle size as measured by laser diffraction analysis under ISO 13320. The present inventors have found that, in at least one embodiment, when using a powder comprising Probiotic microorganisms as described herein, as particle size of the powder decreases, or gets smaller, gravitational forces that predominate on larger particles become less pronounced, and Van der Waals forces predominate. In general, Van der Waals forces predominate for particles sizes less than 100 micrometers, which results in particle sizes less than 100 micrometers being particularly, but not exclusively, advantageous. It should further be understood that the particle sizes as disclosed herein can be for a portion of the particles of a powder. Thus, in one embodiment, a powder can be dusted, wherein a portion of the particles have particles sizes as disclosed herein.

In one embodiment, the surface area of the core that is available for powder adhesion can also affect the adhesion properties of the powder onto the core. In one embodiment, the surface area of the core available is minimally enough so that each particle being applied can contact the surface of the core. In another embodiment, and as those of ordinary skill in the art are aware, extruded dry pet food cores can have irregular textured surfaces, resulting in large surface area and pits, pores, crevices, and the like, as described above, into which many particles can become lodged and thus deposited onto the kibble core. In one embodiment, kibble surface areas of between about 1 $m^2$/9 L of volume and 10 $m^2$/9 L of volume can be used and all whole number ranges therebetween. In another embodiment, a surface area of between about 4 $m^2$/9 L and about 6 $m^2$/9 L can be used.

In one embodiment, and as described in additional detail throughout this disclosure, multiple temperature variables can also affect the adhesion properties of the powder onto the core. For example, the temperature of the core, the temperature of the powder, and the temperature of the dusting process can all, individually and collectively, affect the adhesion properties of the powder onto the core. In one embodiment, the core temperature can be above 0° C., or the freezing point of water. At temperatures below the freezing point of water, ice crystals may form on the surface of the core, resulting in an in increased surface hardness. This increased surface hardness can impede adhesion of the powder. In another embodiment, the core temperature is kept at between 0° C. and 20° C. during any part of the dusting process. In another embodiment, the core temperature is kept at between 0° C. and 80° C., or between at between 0° C. and 60° C., or at between 20° C. and 80° C. during any part of the dusting process. In another embodiment, the core temperature is kept at between 20° C. and 80° C. during any part of the dusting process. Additionally, in another embodiment, the core temperature can be lower than the deactivation point of the Probiotic microorganism or other active material.

In one embodiment, the humidity during dusting can be varied. In one embodiment, the humidity can be less than 20%. In another embodiment, the humidity can be less than 30%. In another embodiment, the humidity can be less than 40%. In another embodiment, the humidity can be less than 50%. In another embodiment, the humidity can be less than 60%. In another embodiment, the humidity can be less than 70%. In another embodiment, the humidity can be less than 80%. In another embodiment, the humidity can vary depending on the temperature of the core during dusting. In one embodiment wherein the temperature of the core is about 40 C, the humidity can be no more than 30%. In another embodiment wherein the temperature of the core is above 40 C, the humidity is no more than 30%.

In another embodiment, the water activity of the kibble can affect dusting. In one embodiment, dusting can occur on a kibble having a water activity of about 0.1 or less. In one embodiment, dusting can occur on a kibble having a water activity of about 0.2 or less. In one embodiment, dusting can occur on a kibble having a water activity of about 0.3 or less. In one embodiment, dusting can occur on a kibble having a water activity of about 0.4 or less. In one embodiment, dusting can occur on a kibble having a water activity of about 0.5 or less. In one embodiment, dusting can occur on a kibble having a water activity of about 0.6 or less. In another embodiment, the core can be at a water content of less than 12% during dusting.

In another embodiment, the dusting of Probiotic powder can occur wherein the loss of activity of the Probiotic can be reduced. In one embodiment, the dusting can result in a log loss of activity of about 0. In another embodiment, the dusting can result in a log loss of activity of less than 0.5. In another embodiment, the dusting can result in a log loss of activity of less than 1.0. In another embodiment, the dusting can result in a log loss of activity of less than 1.5. In another embodiment, the dusting can result in a log loss of activity of less than 2.0. The dusting and associated log loss of activity can occur with any sized Probiotic as disclosed herein.

Thus, embodiments of the present invention can include any combination or mixtures of the above variables.

In one embodiment, a dusted pet food kibble can have an endurance factor. The endurance factor can be indicative of the amount of active or Probiotics, in specific non-limiting examples, which are still considered as active, after experiencing the environment, such as shipping. Thus, as kibbles experience shipping conditions, the activity of the active or Probiotics can be decrease from its dosed, or expected, activity level. The resulting activity, which can be called the actual activity, can be compared to the expected activity, and this comparison can be represented by an endurance factor, which can be a ratio of the actual activity to the expected or dosed activity, as described and detailed hereinafter. In one embodiment, the pet food kibble can have an endurance factor of about 1. In another embodiment, the endurance factor can be between 0 and about 1 and all combinations of tenths therebetween, such as 0.1, 0.2, 0.3, 0.4, 0.5, 0.6, 0.7, 0.8, and 0.9. In another embodiment, the pet food kibble can have an endurance factor of between about 0 and about 0.99. In another embodiment, the pet food kibble can have an endurance factor of between about 0 and about 0.90. In another embodiment, the pet food kibble can have an endurance factor of between about 0.50 and about 0.99. In another embodiment, the endurance factor can be between about 0.4 and about 0.6. In another embodiment, the pet food kibble can have an endurance factor of between about 0.0001 and about 1. In another embodiment, the endurance factor can be between about 0.0001 and about 0.1. In another embodiment, the endurance factor can be between about 0.0001 and about 0.01. In another embodiment, the endurance factor can be between about 0.0001 and about 0.001. In another embodiment, the endurance factor can be between about 0.001 and about 1. In another embodiment, the endurance factor can be between about 0.001 and about 0.1. In another embodiment, the endurance factor can be between about 0.001 and about 0.01. In another embodiment, the endurance factor can be between about 0.001, 0.01, and 0.02 and about 0.01, 0.02, and 0.04, and all combinations thereof.

Process

Processes common to making dry pet foods can include milling, batching, conditioning, extrusion, drying, and dusting. Milling can encompass any process used to reduce whole or partial ingredients into smaller forms. Whole or partial formulations can be created in the process step for batching by mixing dry and/or liquid ingredients. Often these ingredients are not in the most nutritious or digestible form, and thus processes are needed to further convert these ingredients to a digestible form via a cooking process.

During the milling process, the individual starting components of the core material can be mixed and blended together in the desired proportions to form the core material. In one embodiment, the resulting core material can be screened to remove any large agglomerate of material therefrom. Any sort of conventional solids mixer can be used for this step including, but not limited to, plough mixers, paddle mixers, fluidizing mixers, conical mixers, drum mixers, and mixtures and combinations thereof. One skilled in the art of solids mixing would be able to optimize the mixing conditions based on the types of materials, particle sizes, and scale, from any one of a number of widely available textbooks and articles on the subject of solids mixing.

The core material mixture can then be fed into a conditioner. Conditioning can be used to pre-treat the ingredients and can include hydration, addition/mixing of other ingredients, partial cooking, and mixtures and combinations thereof. Cooking can often be accomplished by the addition of heat in the form of steam and can result in discharge temperatures of about 113 to about 212° F. Pressurized conditioning can be used when temperatures need to be elevated above standard atmospheric conditions, such as those greater than about 212° F. Conditioned ingredients can then be transferred to an extruder for further processing.

The core material can then be subjected to an extrusion operation in order to obtain an expanded core pellet. In one embodiment, the core material can be routed to a hopper prior to the extrusion operation. The extruder can be any suitable single or twin screw, cooking extruder. Suitable extruders can be obtained from Wenger Manufacturing Inc., Clextral S A, Buhler A G, and the like. Conditions of the extruder can vary depending on the particular product to be made. For example, the texture, hardness, or bulk density of the extruded product can be varied using changes in the extruder operating parameters. Similar to conditioning, extrusion can be used to incorporate other ingredients (such as carbohydrates, proteins, fats, vitamins, minerals, and preservatives) by having dry and/or liquid ingredient streams added anywhere along the length of the extruder feed port, barrel, or die. Extruders can be, but not limited to, single- or twin-screw in design and designed to operate up to 1700 rpm, or even more. The extrusion process can be often accompanied with high pressure (up to 1500 psig) and high temperature (up to 250° C.). Extrusion can be used to accomplish the making of continuous ropes or sheets but also discrete shapes and sizes of edible food. These forms, shapes, and sizes can be often the result of forcing the materials through a die or set of die openings and cutting or breaking into smaller segments.

Extruded ropes, sheets, shapes, or segments can be transferred to post-extrusion operations. These can include crimping, shredding, stamping, conveying, drying, cooling, and dusting in any combination or multiple of process flow. Crimping can be any process that pinches food together. Shredding is any process that reduces the size of the food upon extrusion, preferably by tearing. Stamping can be any process that embosses a surface or cuts through a food. Conveying can be used to transport food from one operation to another and can change or maintain the state of the food during transport, often being a mechanical or pneumatic process. Drying can be used to reduce process moisture to levels suitable for shelf-life in the finished product. The expanded moist pellets can be typically transported from the extruder outlet to the dryer by a conveying, airveying or augering system. After expansion and transport to the entrance to the dryer, the kibbles have typically cooled to 85-95° C. and have had the moisture reduce by evaporation from about 25-35% to about 20-28%. The temperature of the drying oven can be from about 90° C. to about 150° C. The temperature of the core pellets exiting the drying oven can be from about 90° C. to about 99° C. Dusting processes can then be performed to add carbohydrates, proteins, fats, water, vitamins, minerals, actives, and other nutritional or health benefit ingredients to the food to make an intermediate or finished product, as described in more detail hereinafter. Cooling of the food can be used to reduce the temperature from extrusion and/or drying.

An alternative drying process can be as follows. For typical pet food drying, kibble cores of about 24% moisture content enter a continuous belt dryer for a specific a dwell time to dry to about 6 to about 10% moisture content and a water activity of about 0.3 to about 0.6 when measured at about 25° C. To reduce moisture content and water activity, higher drying temperatures can be used. To further reduce moisture content and water activity, increasing the drying time can be done. Even further drying can be achieved by increasing drying time and temperature. In one embodiment, continuous drying can be achieved in single or multiple air zones and/or single or multiple pass dryers. For example, drying in multiple air zones with multiple passes can further reduce the moisture content and water activity, such as to less than about 6% moisture, or from about 1% to about 6%, and all ranges therebetween. The water activity can be reduced to less than 0.5, even less than 0.1., and can be between 0.05 to about 0.5, and all ranges therebetween. In another embodiment, batch drying can be used. Kibble bed depth, temperature, and drying time can be varied to reach a moisture content and water activity similarly as described with respect to continuous drying. In one non-limiting example, a bed depth of 3.5 inches and a temperature of 310° F. can be used to reach a water activity of 0.1. Additionally, drying belt width and belt speed can be modified.

In one embodiment, the powder can then be dusted onto the core. In one embodiment, the powder may be applied to the cores using a fluidizing paddle mixer. The core pellets can be fed to a fluidizing mixer for the application of the powder in the manufacture of a dusted pet food kibble.

In one embodiment, the fluidizing mixer can be a counter-rotating dual-axis paddle mixer, wherein the axes are oriented horizontally with paddles attached to the counter-rotating axes. A suitable counter-rotating dual-axis paddle mixer can be obtained from Forberg International AS, Larvik, Norway; Eirich Machines, Inc, Gurnee, Ill., USA, and Dynamic Air Inc., St. Paul, Minn., USA. The motion of the paddles in-between the shafts can constitute a converging flow zone, creating substantial fluidization of the particles in the center of the mixer. During operation of the mixer, the tilt of paddles on each shaft can create opposing convective flow fields in the axial directions generating an additional shear field in the converging flow zone. The downward trajectory of the paddles on the outside of the shafts can constitute a downward convective flow. Thus, in one embodiment, the fluidizing mixer has a converging flow zone located in-between the counter-rotating paddle axes.

In one embodiment, the powder can be introduced into the counter-rotating dual-axis paddle mixer such that the powder component is directed upward into the converging zone between the counter-rotating paddle axes. In one aspect, the counter-rotating dual axis paddle mixer can have a converging flow zone between the counter-rotating paddle axes and the swept volumes of the counter-rotating paddles axes do not overlap within the converging flow zone. The powder can be directed into the gap between the swept volumes of the counter-rotating paddle axes. In one aspect, the ingress of the powder into the dual-axis paddle mixer occurs through a distributor pipe located below the converging flow zone of the counter-rotating paddle axes. The distributor pipe can include at least one opening through which the powder passes into the dual-axis paddle mixer.

In one embodiment, the powder can be introduced into the counter-rotating dual-axis paddle mixer such that the powder is directed downward on top of the converging zone between the counter-rotating paddle axes.

In one embodiment, the gap between a paddle tip and fluidizing mixer wall can be greater than the largest dimension of the core pellet being dusted. While not being hound by theory, it is believed that such a gap clearance prevents the core pellets from becoming lodged between the paddle tip and the wall, possibly causing core pellet breakage.

In one embodiment the Froude number of the fluidizing paddle mixer is maintained between 0.1 and 1.5. The Froude number is defined as a dimensionless number $(Fr)=(DN^2/g)$ and relates inertial forces to those of gravity; D is the length of the paddle, N is the rotational frequency of the propeller (rev/sec), and g is the gravitational constant. The Froude number is a dimensionless number comparing inertial forces and gravitational forces. In one embodiment, the inertial forces are the centrifugal forces that are whirling the kibbles and the powder around. At too high a Froude number, the cores and the powder may be over-fluidized resulting in less efficient application of the powder to the cores. At too low a Froude number, the mixing may be too slow to effectively apply the powder to the core.

In one embodiment, the length of application of the powder to the core using a mixer can be between 1 second and 10 minutes, and all ranges of seconds therebetween. In one embodiment, application times of between 10 and 60 seconds have been found to have improved levels of adhesion of powder to the cores, although those application times are not meant to be limiting.

In general, some of the powder may not adhere to the core during the application process as described herein. In one embodiment after the application of the powder to the core, the powder that has not adhered to the core can be removed from the dusted cores by any convenient method, a non-limiting example of which is sieving. This powder can then be used for the next batch of dusting. In one embodiment, the free powder and the dusted cores can both be sent together to the next step in the manufacturing process.

In one embodiment, the electrostatic charges of the powder can be varied to affect the adhesion of the powder to the cores. By electrostatic charges is meant the deliberate addition or subtraction of electric charges to the powder and/or the cores beyond what is present during ambient conditions. Electrostatic charges can be applied to the powder and/or the cores by any convenient method. Numerous types of equipment are commercially available for applying charges to particles for dusting purposes. Non-limiting examples of such equipment are the Nordson® Encore™, or the ITW Ransburg® No. 2 Gun/Deuce Unit™. The type of charge (positive or negative) and the amount of charge can be varied depending on the materials of composition of the core and the powder, and the amount of electrostatic adhesion required.

In one embodiment, the method of application of the powder to the cores can be varied to affect the adhesion of the powder to the core. In one embodiment, the method of dispersing the powder among the kibbles can include, but is not limited to, manual application, non-limiting examples of which include sprinkling, spraying, or metering via a loss in weight feeder, auger or belt, and mixtures and combinations of these. Various types of equipment can be used to improve the dispersal and contact of the powder with the surface of the cores. Any sort of conventional solids mixer can be used for this step including, but not limited to, plough mixers, paddle mixers, fluidizing mixers, conical mixers, drum mixers, and mixtures and combinations of these. One skilled in the art of solids mixing could be able to optimize the mixing conditions based on the types of materials, particle sizes, and scale, from any one of a number of widely available textbooks and articles on the subject of solids mixing.

In one embodiment, the core, after being formed into a core but before being dusted as described herein, is not moistened. Thus, in one embodiment, the core can be at below 12% moisture content prior to, and/or during the dusting process. In another embodiment, the core is not treated in any other way to aid in adherence of the particles of the powder, except as provided for herein.

During the dusting process, in one embodiment, the core can be dusted with a first component, as described herein, such as an active as disclosed herein. The core can then be dusted, or coated, with a second component, as described herein. Additional components can be dusted, up to as many components as desired. Additionally, in one embodiment, the desired number of components can be dusted simultaneously, or in any order or timing possible. Thus, a first component and a second component can be dusted simultaneously; or a first component can be dusted for a first time period during which a second component and a third component can begin to be dusted. As one of skill in the art can see, any variation of timing and components can be envisioned.

It should additionally be understood after the dusting process occurs with any core kibble, additional layers, dustings, or even coatings can be applied as is known to those of ordinary skill in the art. Coatings of any component, such as a fat, can be provided. Other dustings, as disclosed herein, can be provided. Thus, any amount and number of coatings and dustings of components described herein and of components used in animal feed can be provided.

Grinding/Milling of Active

In one embodiment, the active ingredient, such as a Probiotic microorganism, its constituents, preservative aids, and/or stability aids, can be ground or milled into a powder for use in dusting as described herein. Any grinding machine or mill can be used. Non-limiting examples of grinding processes and/or mills that can be used include compression grinding, jet mills, air classifying mills, universal mills, pin mills, hammer mills, and even mortar and pestal.

In one embodiment, it has been found that controlling temperature during milling can assist in not affecting the active ingredient, such as a Probiotic microorganism, deleteriously. For example, in some embodiments, high temperature can result from friction during grinding or milling, and the high temperature can negatively impact the active ingredient to the point of burning up and destroying the active. For example, some grinding and/or milling processes can have a screen that the active ingredient must pass through. However, if using an active that tends to be sticky or have particular adhesion properties, the screen can become plugged with agglomerated active ingredient, which can result in the build up of friction in the mill, which in turn can produce heat that kills off the active ingredient.

In one embodiment, the milling process can result in the active ingredient reaching a temperature of less than about 65° C. In another embodiment, the active ingredient can reach a temperature of less than about 50° C. In another embodiment, the active ingredient can reach a temperature of less than about 35° C. In another embodiment, the active ingredient can reach a temperature of between about 25° C. and about 65° C. In another embodiment, the active ingredient can reach a temperature of between about 25° C. and about 50° C. In another embodiment, the active ingredient can reach a temperature of between about 25° C. and about 35° C. In another embodiment, the active ingredient can reach a temperature of between about 30° C. and about 35° C. In another embodiment, the grinding/milling is performed at ambient temperature and humidity, such as 20-25° C. and 20-30% relative humidity, respectively.

In another embodiment, the grinder or mill can be used with an air stream that helps to control temperature. In one embodiment, cool air can be blown over the active during the grinding/milling process. The cool air can be effective in preventing deleterious heat build-up of the active ingredient that results in killing off the active ingredient.

As disclosed herein, the water activity of the kibble, in some embodiments can be about 0.6 or less, 0.5 or less, 0.4 or less, 0.3 or less, 0.2 or less, and 0.1 or less. Some of these low water activities result from additional drying that is not normally used in conventional pet food kibbles. However, in some embodiments this additional drying can be utilized to ensure survival of the active ingredient, such as a Probiotic. In some embodiments, it has been found that this additional drying and thus these low water activities do not negatively impact food preference by the animal. Additionally, in some embodiments, it has been found that in fact the food preference by the animal can be increased.

Pet Food Mixture

In another embodiment, the present disclosure can provide a kibble-type pet food comprising a first kibble and a second kibble. The first kibble can comprise a source of protein of from about 16% to about 50% by weight of the first kibble, a source of fat of from about 5% to about 35% by weight of the first kibble, and a source of carbohydrate of from about 15% to about 50%. The second kibble can comprise a kibble comprising a dusted on active, such as but not limited to, a Probiotic as described hereinabove. The first kibble can be with or without an active, or with or without a dusting comprising an active.

According to these embodiments, the first kibble can be a kibble that can provide protein, fat, and carbohydrate necessary for a diet to maintain good nutrition by the animal. In certain embodiments, the first kibble can comprise a source of protein ranging from 0% up to 50% by weight of the first kibble. In other embodiments, the source of protein can range from 16% to 50% by weight, or even 20% to 50% by weight of the first kibble. It will be recognized by one of skill in the art that many kibble formulations can be used in the first kibble to provide the desired amount of additional protein, fat, and carbohydrates. In addition, the first kibble can comprise additional ingredients, such as vitamins, minerals, colorants, flavorants, and the like.

In certain embodiments, the second kibble can comprise up to 90% of the kibbles in the pet food. For example, the second kibble can comprise from 1% to 90% of the kibbles, or from 1% to 50% of the kibbles, or from 1% to 25% of the kibbles in the pet food, or from 1% to 15%, or 10%. Alternatively, the kibbles can be present in specific ratios of the first kibble to the second kibble. For example, in one embodiment of the pet food compositions of the present disclosure, the first kibble and the second kibble can be present at a ratio of at least 2:1, or at least 5:1, or at least 9:1, or at least 10:1, all by the number of kibbles present, such as the kibbles in a package. In another embodiment of the disclosure, the first kibble and the second kibble can be present at a ratio of from about 2:1 to about 50:1, or from about 5:1 to about 25:1, or from about 10:1 to about 20:1. Additionally, the pet food kibbles, in the form of a first kibble and a second kibble, can be present in weight ratios. In certain embodiments, the first kibble and the second kibble can be present at a ratio of at least 1:1, or at least 2:1, or at least 5:1, or at least 9:1, or at least 10:1, all by weight of the kibbles present, such as the kibbles in a package. In another embodiment of the disclosure, the first kibble and the second kibble can be present in a weight ratio of from about 2:1 to about 50:1, or from about 5:1 to about 25:1, or from about 10:1 to about 20:1.

In various embodiments, and as described herein, the second kibble can further comprise at least one active dusted on at least a portion of a surface of the core. For example, the at least one active dusting can comprise any of the actives described herein. In a specific embodiment the, at least one active can be a Probiotic powder, as described herein.

The pet food composition can be comprised of physically distinct components (i.e., the first kibble and the second kibble). The pet food can be provided as a variety of different presentations of the first kibble and the second kibble. For example, the pet food composition can be provided as a heterogeneous mixture of the first kibble and the second kibble. Alternatively, the first kibble and the second kibble can be provided as discretely packaged components, which can be combined in any manner or amount desired at the time of feeding. To illustrate, the pet food composition can comprise a first containing device and a second containing device, wherein the first containing device contains at least a portion of the first component and the second containing device contains at least a portion of the second component; for example, the first containing device can be a bag whereas the second containing device can be a canister. For convenience of the consumer, the bag containing at least a portion of the first component can also contain the canister containing at least a portion of the second component. Any of a variety of other presentations will be well-understood by those of ordinary skill in the art.

The pet food compositions or components thereof can be nutritionally balanced. The first kibble of the pet food compositions of the present disclosure comprises a source of protein, a source of fat, and a source of carbohydrate. Examples of a first kibble include traditional pet food kibbles. The first kibble itself can be, or may not be, nutritionally balanced. In one embodiment, the first component can be nutritionally balanced.

In one embodiment, the first kibble can comprise, on a dry matter basis, from about 20% to about 50% protein source, or from about 22% to about 40% protein, by weight of the first kibble. The protein material can comprise any material having a protein content of at least about 15% by weight, non-limiting examples of which include vegetable proteins such as soybean, cottonseed, and peanut, animal proteins such as casein, albumin, and meat tissue. Non-limiting examples of meat tissue useful herein include fresh meat, and dried or rendered meals such as fish meal, poultry meal, meat meal, bone meal, and the like. Other types of suitable crude protein sources include wheat gluten or corn gluten, and proteins extracted from microbial sources such as yeast.

The first kibble can comprise a source of fat. In one embodiment, the first kibble can comprise, on a dry matter basis, from about 5% to about 35% fat, preferably from about 10% to about 30% fat, by weight of the first component. Sources of fat are widely known, including any component comprising a source of fat, defined herein to be inclusive of, for example, wax, fat, fatty acid, and lipid. Specific examples of wax, fat, fatty acid, or lipid can often be interchangeable in accordance with nomenclature common in the art; for example, a lipid can often also be characterized as a fat. The inventors herein do not intend to be limited by any particular designation of nomenclature, and classifications of a particular material as a wax, fat, fatty acid, lipid, or the like is made for purposes of convenience only.

For example, the lipid component can comprise a fat that is a cocoa butter component or a plant oil or partially hydrogenated plant oil. Alternatively or additionally, the lipid component can comprise an animal-derived fat component. As will be commonly known in the art, the animal-derived fat component comprises a fat derived from an animal. Non-limiting examples include beef, poultry, pork, and lamb (e.g., lards and tallows). Dairy fats can also be examples, including milkfat, fractionated milkfat, and butterfat. Alternatively or additionally, the lipid component can comprise a fatty acid. Illustrative sources include omega-3 or omega-6 fatty acids. Other examples of suitable fatty acids can include oleic acid, stearic acid, palmitic acid, and lauric acids, including suitable salts thereof. Even further examples of suitable fatty acids include esters or other derivatives thereof, such as cetyl palmitate, acetic, lactic, or citric mono- and di-glyceride fatty acids, isopropyl palmitate, isopropylmyristate, and mono-, di-, and triglycerides (some of which can also be characterized as fats). Alternatively or additionally, the compositions can comprise wax.

For example, illustrative waxes include paraffin wax, beeswax (e.g., white or yellow), carnuba wax, candellila wax, microcrystalline wax, rice bran wax, cetyl ester wax, and emulsifying wax.

Grains or cereals such as rice, corn, milo, sorghum, barley, alfalfa, wheat, and the like are illustrative sources of carbohydrate. These carbohydrate sources, and typical levels thereof, are widely known in traditional pet food compositions.

The present compositions, such as those comprising an active dusting, such as but not limited to, an enriched dusting, can be used to deliver benefit following oral consumption in animals, such as a pet. This benefit generally maintains and improves the overall health of the animal. Non-limiting elements of animal health and physiology that benefit, either in therapeutically relieving the symptoms of, or disease prevention by prophylaxis, or improvement of overall health, including treatment of the immune system, treatment of the gastrointestinal system, treatment of skin or coat, treatment of stress, and mixtures and combinations thereof. Non-limiting examples include inflammatory disorders, immunodeficiency, inflammatory bowel disease, irritable bowel syndrome, cancer (particularly those of the gastrointestinal and immune systems), otitis externa, diarrheal disease, antibiotic associated diarrhea, appendicitis, autoimmune disorders, multiple sclerosis, Alzheimer's disease, amyloidosis, rheumatoid arthritis, arthritis, joint mobility, hip dysplasia, diabetes mellitus, insulin resistance, bacterial infections, viral infections, fungal infections, periodontal disease, urogenital disease, idiopathic cystitis, interstitial cystitis, surgical associated trauma, surgical-induced metastatic disease, sepsis, weight loss, weight gain, excessive adipose tissue accumulation, anorexia, fever control, cachexia, wound healing, ulcers, gut barrier infection, allergy, asthma, respiratory disorders, circulatory disorders, coronary heart disease, anemia, disorders of the blood coagulation system, renal disease, disorders of the central nervous system, hepatic disease, ischemia, nutritional disorders, treatment or prevention of disorders involving the hypothalamus-pituitary-adrenal (HPA) axis, osteoporosis, endocrine disorders, and epidermal disorders. Treatment includes treatment of the gastrointestinal tract, including treatment or prevention of diarrhea; immune system regulation, preferably the treatment or prevention of autoimmune disease and inflammation, maintaining or improving the health of the skin and/or coat system, preferably treating or preventing atopic disease of the skin (e.g., dermatitis or eczema), treatment or prevention of disorders involving the hypothalamus-pituitary-adrenal (HPA) axis, ameliorating or reducing the effects of aging, including mental awareness and activity levels, and preventing weight loss during and following infection. Treatment of the various disorders described herein can be measured using techniques known to those of ordinary skill in the art, for example, those methods of measurement disclosed in U.S. Published Application No. US 2006/0228448A1.

EXAMPLES

Example 1

The activity level of the Probiotic microorganisms are shown for three particle sizes in Table 1. These different particle sizes were used in the accompanying examples as noted. Table 1 shows that the activity level generally is consistent and within one log among different particle sizes.

TABLE 1

Activity in Probiotic

| Average Particle Size, μm | Activity cfu/g | Average |
|---|---|---|
| >355 | 8.1E+11 | 3.9E+12 |
| >355 | 9.9E+12 | |
| >355 | 8.5E+11 | |
| 250-355 | 8.9E+11 | 8.5E+11 |
| 212-250 | 1.2E+12 | 6.6E+11 |
| 180-212 | 4.5E+11 | 4.0E+11 |
| 180-212 | 3.1E+11 | |
| 180-212 | 4.3E+11 | |
| 106-180 | 7.4E+11 | 4.4E+11 |
| 90-106 | 2.4E+11 | 2.4E+11 |
| 90-106 | 3.5E+11 | |
| 90-106 | 1.2E+11 | |
| 75-90 | 1.2E+11 | 8.8E+10 |
| <75 | 5.7E+10 | 5.7E+10 |

For examples 2-4, standard commercial gelatinized starch kibble cores were made of an extruded and dried mixture of ground corn, sorghum, chicken meal, minerals, vitamins, amino acids, fish oil, water, and beet pulp. Bifidobacteria Probiotic microorganisms as powder with maltodextrin and ascorbic acid were dusted onto the kibble cores using a Forberg paddle mixer set at low speed as outlined in Example 6. The dusting occurred in the fluidized zone over 45 seconds.

Example 2

Several Probiotic powder samples are applied to cores according to the procedure in Example 6. Cores are dusted with Probiotic powder sieved to below the particle size as shown in Table 2. Table 2 below shows that smaller particle sizes are more effective in retaining the Probiotic activity in the dusted product. Thus, it was found that Probiotic particles from 143 and below in size achieve a dosage with less than 0.5 logs loss, as shown in Table 2. The particles were dusted on a kibble core of approximately 10 mm in diameter. This example shows the relevant activities based on particle size.

TABLE 2

Effect of Particle Size

| Average Particle Size (microns) | Run | Target Activity | Average Activity | Log Loss Average | St Dev | Average Loss |
|---|---|---|---|---|---|---|
| 355 | 1 | 3.9E+09 | 4.4E+07 | 1.9 | 0.065 | 1.8 |
| 355 | 2 | 3.9E+09 | 9.2E+07 | 1.6 | 0.255 | |
| 302.5 | 1 | 8.5E+08 | 4.1E+07 | 1.3 | 0.107 | 1.2 |
| 302.5 | 2 | 8.5E+08 | 5.8E+07 | 1.2 | 0.138 | |
| 231 | 1 | 6.6E+08 | 5.5E+07 | 1.1 | 0.079 | 1.1 |
| 231 | 2 | 6.6E+08 | 5.8E+07 | 1.1 | 0.212 | |
| 196 | 1 | 4.0E+08 | 9.1E+07 | 0.6 | 0.159 | 0.6 |
| 196 | 2 | 4.0E+08 | 1.0E+08 | 0.6 | 0.018 | |
| 143 | 1 | 4.4E+08 | 9.8E+07 | 0.7 | 0.096 | 0.6 |
| 143 | 2 | 4.4E+08 | 1.4E+08 | 0.5 | 0.218 | |
| 98 | 1 | 2.4E+08 | 9.4E+07 | 0.4 | 0.043 | 0.4 |
| 98 | 2 | 2.4E+08 | 9.6E+07 | 0.4 | 0.098 | |
| 82.5 | 1 | 1.2E+08 | 7.3E+07 | 0.2 | 0.047 | 0.2 |
| 82.5 | 2 | 1.2E+08 | 6.6E+07 | 0.3 | 0.058 | |
| 37.5 | 1 | 5.7E+07 | 8.1E+07 | 0.0 | 0.017 | 0.0 |
| 37.5 | 2 | 5.7E+07 | 7.3E+07 | 0.0 | 0.000 | |

Example 3

To demonstrate the effect of surface area, a range of kibble core sizes were dusted while keeping the total weight of the cores and the total weight of the Probiotic powder constant for each run. As shown in Table 3, the increased surface area of the kibble did not have a significant impact on the level of activity achieved. Thus, the actual activity measured did not significantly differ from the expected activity. The Probiotic powder was sieved so that all the particles in the powder were less than about 75 microns prior to application to the cores.

TABLE 3

Effect of Surface Area

| Kibble Surface area ($m^2$/9 L) | Expected Activity (cfu/g) | Actual Activity (cfu/g) | Log Loss of Activity log (expected) − log (actual) |
|---|---|---|---|
| 4.26 | 7.85E+08 | 3.90E+08 | 0.30 |
| 5.00 | 7.05E+08 | 2.35E+09 | ~0 |
| 5.68 | 7.90E+08 | 3.34E+08 | 0.37 |

Example 4

To demonstrate the effect of kibble core temperature, a range of kibble core temperatures prior to dusting were tested. As shown in Table 4, a kibble at lower temperature resulted in less activity loss. The Probiotic powder was sieved so that all the particles in the powder were less than about 75 microns prior to application to the cores. The size of the cores was approximately round in shape with an approximate average diameter of about 10 mm.

TABLE 4

Effect of Temperature

| Kibble Temperature (C.) | Expected Activity (cfu/g) | Actual Activity (cfu/g) | Log Loss of Activity log (expected) − log (actual) |
|---|---|---|---|
| 56 | 9.81E+08 | 2.83E+08 | 0.54 |
| 20 | 6.67E+08 | 3.50E+08 | 0.28 |
| 0 | 9.84E+08 | 6.33E+08 | 0.19 |

Example 5

A simulated ship test was conducted that utilized 10% dusted kibbles and 90% enrobed with fat kibbles, by weight. The dusted kibbles were dusted or dry mixed in a model FZM-0.7 20 liter capacity Forberg fluidized zone mixer manufactured by Eirich Machines, Inc., Gurnee, USA, by mixing at about 85 RPM while dusting in the Probiotic powder over the fluidized zone. Unenrobed kibble core were enrobed with poultry fat in a model FZM-7 200-liter capacity Forberg fluidized zone mixer manufactured by Eirich Machines, Inc., Gurnee, Ill., USA, for about 45 seconds. Immediately after enrobing, the dusted kibbles were poured into the 200 L mixer with the enrobed kibble and mixed for an additional 30 seconds. The resulting product was bagged in 40 pound multi-wall paper bags and stacked eight bags high on a pallet. The pallet was then wrapped and shipped approximately 60 miles, at which point it was run through a simulated ship test using a MTS Hydraulic Vibration Table set at frequencies from 1-200 Hz with an intensity of 0.52 G rms for three hours. After the ship test, the product was shipped 60 miles where a bag from the top, middle, and bottom of the eight bag stack were evaluated for Probiotic activity, which is shown in Table 5. As shown, even after the simulated shipping, the activity was only an average of one log lower than the expected activity.

TABLE 5

Ship Test

| Position on Pallet | Expected Activity (cfu/g) | Actual Activity (cfu/g) | Log Loss of Activity log (expected) − log (actual) |
|---|---|---|---|
| Top | 5.10E+06 | 2.23E+05 | 1.36 |
| Middle | 5.10E+06 | 7.07E+06 | ~0 |
| Bottom | 5.10E+06 | 1.23E+05 | 1.62 |

Example 6

About 6000 g of approximately 10 mm diameter cores are introduced into a fluidizing paddle mixer in a hopper located above the paddle mixer. At the time of their introduction to the mixer, the temperatures of the cores is about 80° C. The mixer is a model FZM-0.7 Forberg fluidized zone mixer manufactured by Eirich Machines, Inc., Gurnee, Ill., USA. The mixer has about 20 liters of effective volume capacity. Once the cores have been added to the mixer, the paddles are rotated to fluidize the kibbles. About 2 g of Probiotic powder are added to the mixer by manually sprinkling the powder over the fluidized zone of the mixer for a specified amount of time. At the end of the addition of the mixture, the doors at the bottom of the mixer are opened to dump the dusted kibbles into a metal receiver. These dusted kibbles are mixed with fat coated cores in the ratio of 1 part by weight dusted cores to 9 parts by weight fat coated cores. Table 6 shows that varying the speed of the paddles between about 50 RPM and 85 RPM does not affect the retention of the powder onto the dusted kibbles. 50 RPM corresponds to a Froude number of about 0.35, and 85 RPM corresponds to a Froude number of about 0.6. Table 6 also shows that the time of application of the powder between about 10 seconds and about 30 seconds does not affect the retention of the powder on the cores.

TABLE 6

| Experiment | RPM | Mix Time, s | Target, cfu/g | Activity, cfu/g | log loss |
|---|---|---|---|---|---|
| 1 | 50 | 30 | 5.0E+06 | 3.6E+05 | 1.1 |
| 2 | 50 | 10 | 5.0E+06 | 4.0E+05 | 1.1 |
| 3 | 80 | 30 | 5.0E+06 | 2.6E+05 | 1.3 |
| 4 | 80 | 10 | 5.0E+06 | 3.0E+05 | 1.2 |

Example 7

One sample of Probiotic powder is sieved so that all the particles are less than about 75 microns. This Probiotic powder is applied to cores according to the procedure in Example 6. A second sample of Probiotic powder is sieved so that all the particles are between about 45 and about 75 microns. This Probiotic powder is applied to a second set of cores according to the procedure in Example 6. Table 7 below shows that screening out the particles below about 45 microns does not affect the efficacy of application of the powder to the cores.

TABLE 7

| Powder Particle Size (microns) | Target Activity (cfu/g) | Actual Activity Test (cfu/g) |
| --- | --- | --- |
| 0-75 | 5.00E+06 | 5.E+05 |
| 45-75 | 5.00E+06 | 5.E+05 | and the second type of kibble was a dog food kibble dusted with Probiotics. Both kibbles were dried to levels as shown in Table 8. Kenneled dogs were fed the dog foods. It should be noted in Table 8 that the moisture and Aw values were measured as products were fed.

As can be seen in Table 8, the comparison of the Control #1 product to the Control #2 resulted in a 4:1 preference of the Control #2 product based on total volume. However, as the moisture (and thus Aw) content was decreased, a progressive decrease in the preference of the Control #2 product occurred with no significant preference difference detected between the low Aw prototype (Dried #2) and the Control #2 product. When two different levels of additional drying were compared to the same product at normal commercial moisture levels (Control #1), or another commercially available dog food (Control #3), the most dried product (Dried #2) had an improved impact on dog preference. These findings show general agreement in that as moisture was decreased, improved preference occurred.

TABLE 8

Summary Results of Preference Tests

| Test #1 v. Test #2 (column headings) | Control #1 vs. Control #2 | Dried #1 vs. Control #2 | Dried #2 vs. Control #2 | Dried #1 vs. Control #1 | Dried #2 vs. Control #1 | Control #1 vs. Control #3 | Dried #1 vs. Control #3 | Dried #2 vs. Control #3 |
| --- | --- | --- | --- | --- | --- | --- | --- | --- |
| Test #1 Moist/Aw | 6.5%/0.38 | 4.8/0.37 | 1.9%/0.24 | 4.8%/0.23 | 2.1%/0.12 | 6.36/0.35 | 4.76/0.24 | 1.97/0.11 |
| Test #2 Moist/Aw | 7.4%/0.44 | 7.5%/0.45 | 7.5%/0.45 | 6.8%/0.35 | 6.7%/0.36 | 8.44/0.52 | 8.30/0.53 | 8.30/0.53 |
| Total Volume (g/d) | 1:4.0* | 1:3.0* | 1:1.2 | 1:1.8* | 1.3:1 | 1:31* | 1:10.9* | 1:6.6* |
| Percent Converted Intake (%/animal/d) | 1:3.0* | 1:2.7* | 1.2:1 | 1:1.6* | 1.9:1* | 1:21* | 1:8.3* | 1:5.9* |
| First Bite | 1:7.5 | 1:9.8 | 1:2.1 | 1:2.1 | 1.5:1 | ∞*** | ∞*** | 1:14 |
| Preference Segmentation** | 9/73/18* | 7/60/33* | 40/40/20 | 14/57/29 | 44/11/44 | 100/0/0* | 94/0/6* | 81/6/13* |

*P < 0.05
**Preference Segmentation = % dogs preferring first product/% dogs preferring second product/% dogs showing no preference
***= divisor was zero

Example 8

Four dog foods were compared as shown in the following Table 8 by varying the moisture content and water activities. Eight comparisons were made, as shown in the second through ninth columns of Table 8. The lower moisture products, Dried #1 product and Dried #2 product, were compared to the Control #1 product, Control #2 product, and Control #3 product. Control #1 product was made up of two different types of kibbles in a 90:10 by weight ratio. The first type of kibble was a fat/palatant coated dog food kibble, and the second type of kibble was a Probiotic dusted dog food kibble. Both kibbles were dried to normal commercial levels, as shown in Table 8. Control #2 product was a commercially-available dog food kibble having normal levels of fat and palatant coating (no Probiotic) dried to normal commercial levels, as shown in Table 8. Control #3 product was another commercially-available dog food kibble, different from Control #2, having normal levels of fat and palatant coating (no Probiotic) dried to normal commercial levels, as shown in Table 8. Dried #1 product was made up of two different types of kibbles in a 90:10 by weight ratio. The first type of kibble was a fat/palatant coated dog food kibbles, and the second type of kibble was a dog food kibble dusted with Probiotics. Both kibbles were dried to levels as shown in Table 8. Dried #2 product was made up of two different types of kibbles in a 90:10 by weight ratio. The first type of kibble was a fat/palatant coated dog food kibbles, Methods Activity of Probiotic The test method of determining the activity level of Probiotics in animal food can be performed as follows.

Sample Preparation: Into a sterile stomach bag (commercially available from Interscience Laboratories Inc., Weymouth, Mass.), the sample for measurement is aseptically weighed, and the weight is recorded. The sample is diluted by adding room temperature Butterfield's Phosphate Buffered Dilution Water (Bacteriological Analytical Manual, 8$^{th}$ Edition) until at a 1:10 dilution (meaning, if sample weighs 3 grams, add buffer until the scale reads 30 grams). The sample is allowed to soften for about 20 to 30 minutes, then it is flattened and broke into small pieces, then place into a MINIMIX stomacher (commercially available from Interscience Laboratories Inc., Weymouth, Mass.) for two minutes at a speed of 9.

Sample Dilution: Upon completion of stomaching, 1 milliliter of the mixed sample is transferred into a 9 milliliter dilution tube containing Butterfield's Phosphate Buffered Dilution Water (making a −2 dilution). Serial dilute the sample by transferring 1 milliliter from the −2 dilution into a different 9 milliliter dilution tube (making a −3 dilution). This step is repeated until the desired dilution for plating has been reached. Each tube is vortexed prior to performing the next dilution.

Sample Plating: The sample is plated in duplicate on Difco Lactobacilli MRS Agar (DeMan, Rogosa and Sharpe Agar) at −6, −7, and −8 dilutions. To plate the dilution of −8, 0.1 milliliters from the −7 dilution tube is transferred onto a room temperature MRS plate. Appropriate dilutions are repeated, vortexing the tube immediately prior to plating. Samples are spread evenly over the entire surface of the plate, using a sterile spreader. Plates are positioned, inverted, in a 7 liter anaerobic jar (Mitsubishi). An anaerobic indicator (Oxoid) is placed inside the jar. Three AnaeroPack (Mitsubishi) sachets are obtained and opened, with one sachet in one side compartment and two sachets in the other side compartment. The lid is placed on top of the jar and a good seal is ensured. The anaerobic jar is placed in an incubator at 37° C.+/−2° C. for a 48 hour incubation period.

Probiotic Microorganism Enumeration: After incubating for 48 hours, the plates are removed from the incubator and typical bacterial colonies are counted manually using a Quebec Colony Counter to magnify the colonies. Plates are enumerated in the range of 25-250 colonies. Once a raw count (number of colonies counted on the plate) is completed, the dilution is accounted for; therefore, the raw count is multiplied by the reciprocal of the dilution to provide CFU/gram of sample.

Water Activity

Water activity may be determined using methods known to those skilled in the art. Water activity can be determined using a NovaSina TH200 Water Activity Meter at 25° C. or other suitable device as is known in the art. Briefly, the meter is calibrated using calibration salts. The sample to be measured is temperature equilibrated in the meter, following which the water activity is determined as the percent relative humidity (% RH) divided by 100 after equilibrium is reached (typically 10 to 20 minutes).

Particle Size

When determining particle size, the particle size can be defined as the particle size as measured by laser diffraction analysis, such as by International Organization for Standardization (ISO) method 13320.

For particles of irregular shape and dimension, particle size can be defined as measured by way of mesh screens using ASTM E 11-70 (1995).

Endurance Factor

To calculate the endurance factor, kibbles are sent through a simulated ship test. Dusted kibbles are bagged in 40 pound multi-wall paper bags, such as any standard commercially available dog food bag, and stacked eight bags high on a pallet. The pallet was then wrapped and shipped approximately 60 miles, at which point it was run through a simulated ship test using a MTS Hydraulic Vibration Table set at frequencies from 1-200 Hz with an intensity of 0.52 G rms for three hours. After the ship test, the product was shipped 60 miles where a bag from the top, middle, and bottom of the eight bag stack were evaluated for Probiotic activity, which is shown in Table 5. The endurance factor was calculated as being the ratio of the actual activity measured of the Probiotic and the dosed, or expected, activity of the Probiotic.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for dusting a pet food kibble, comprising:
   dusting a powder comprising bacterial Probiotic microorganisms having a particle size less than about 75 micrometers onto a kibble comprising less than 12% moisture to form a dusted pet food kibble having a water activity of about 0.1 or less,
   wherein the powder and the dusting process are substantially free of a carrier.

2. The process of claim 1, wherein the dusting results in a Probiotic activity of greater than about $10^5$ CFU/g of the dusted pet food kibble.

3. The process of claim 1, wherein the dusting results in the dusted pet food kibble having an endurance factor between about 0.1 and about 0.001.

4. The process of claim 1, wherein a less than 0.5 log loss of a Probiotic activity occurs after dusting is complete.

5. The process of claim 1, wherein the bacterial Probiotic microorganisms have a particle size of between about 10 micrometers and about 75 micrometers.

6. The process of claim 1, wherein the kibble temperature is between about 0° C. and about 80° C. during dusting.

7. The process of claim 1, wherein the dusting comprises exposing substantially all of the surface area of the kibble to the powder.

8. The process of claim 7, wherein the dusting is performed with a mechanical mixer.

9. The process of claim 1, further comprising grinding the powder that comprises the bacterial Probiotic microorganisms using a pin mill, wherein the temperature of the powder that comprises the bacterial Probiotic microorganisms is between about 30° C. and about 35° C. during grinding.

10. A process for dusting a pet food kibble, comprising:
    providing a core matrix that is nutritionally balanced and comprises a carbohydrate source comprising a gelatinized starch matrix, a protein source, and a fat source;
    providing a powder comprising bacterial Probiotic microorganisms having a particle size less than about 75 micrometers; and
    dusting the powder onto the core matrix to form a dusted pet food kibble having a water activity of about 0.1 or less;
    wherein the powder and the dusting process are substantially free of a carrier.

11. The process of claim 10, wherein the bacterial Probiotic microorganisms have a particle size of between about 10 micrometers and about 75 micrometers.

12. The process of claim 10, wherein the log loss of a Probiotic activity after the dusting step is less than 1.0.

13. The process of claim 10, further comprising mixing the dusted pet food kibble with kibbles that are not dusted with the powder that comprises the bacterial Probiotic microorganisms.

14. A process for dusting a pet food kibble, comprising:
   extruding a protein source, a carbohydrate source, and a fat source into a pet food kibble in the form of a core matrix comprising a gelatinized starch;
   drying the core matrix in a dryer; and
   dusting a powder comprising bacterial Probiotic microorganisms having a particle size less than about 75 micrometers onto the core matrix having a water activity of about 0.1 or less to form a dusted pet food kibble;
   wherein the powder and the dusting process are substantially free of a carrier.

15. The process of claim 1, wherein the dusting occurs substantially free of a stability aid and a preservative aid.

16. The process of claim 10, wherein the dusting occurs substantially free of a stability aid and a preservative aid.

17. The process of claim 14, wherein the dusting occurs substantially free of a stability aid and a preservative aid.

* * * * *